(12) United States Patent
Borrill

(10) Patent No.: US 11,886,428 B2
(45) Date of Patent: Jan. 30, 2024

(54) GENERALIZED REVERSIBILITY FRAMEWORK FOR COMMON KNOWLEDGE IN SCALE-OUT DATABASE SYSTEMS

(71) Applicant: Eric Litak, Reno, NV (US)

(72) Inventor: Paul L. Borrill, Palo Alto, CA (US)

(73) Assignee: Eric Litak, Reno, NV (US)

( * ) Notice: Subject to any disclaimer, the term of this patent is extended or adjusted under 35 U.S.C. 154(b) by 0 days.

(21) Appl. No.: 18/052,561

(22) Filed: Nov. 3, 2022

(65) Prior Publication Data

US 2023/0169069 A1    Jun. 1, 2023

Related U.S. Application Data

(63) Continuation of application No. 16/694,054, filed on Nov. 25, 2019, now Pat. No. 11,526,493.

(60) Provisional application No. 62/773,558, filed on Nov. 30, 2018.

(51) Int. Cl.
*G06F 16/00* (2019.01)
*G06F 16/23* (2019.01)
*H04L 67/10* (2022.01)

(52) U.S. Cl.
CPC .......... *G06F 16/2379* (2019.01); *H04L 67/10* (2013.01)

(58) Field of Classification Search
CPC .... G06F 16/2379; G06F 16/27; G06F 9/3869; G06Q 20/0655
USPC .......................................................... 707/703
See application file for complete search history.

(56) References Cited

U.S. PATENT DOCUMENTS

| 9,774,401 | B1* | 9/2017 | Borrill | ................. H04L 9/0852 |
| 2010/0088680 | A1* | 4/2010 | Ganai | ................. G06F 11/3608 717/126 |
| 2016/0342986 | A1* | 11/2016 | Thomas | ............... G06Q 20/401 |

* cited by examiner

*Primary Examiner* — Vincent F Boccio
(74) *Attorney, Agent, or Firm* — BHASIN LAW, A PC

(57) ABSTRACT

A computer-implemented system with a processor provides a reversible transfer of an atomic token from one side of an imperfect link to the other, such that if the protocol (or process) on either side fails at a critical moment, the atomic token will be found on both sides to be verifiably incomplete, unless the protocol has completed successfully past its 'irreversible threshold' on both sides.

20 Claims, 28 Drawing Sheets

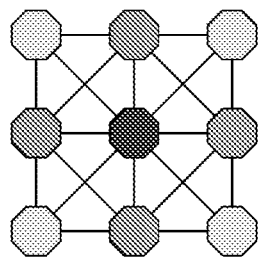
(a) Basic Consensus Tile (3 x 3)
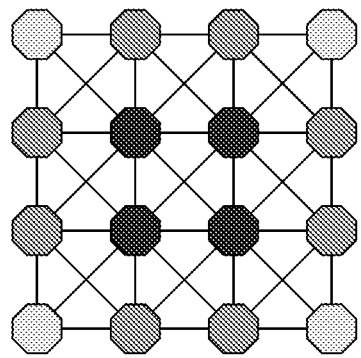
(b) Extended Consensus Tile (4 x 4)
FIG. 1

Microtransactions (ZPC Fire & Forget) — Cellular Fabrix

*Continued from previous figure*

(b) Cohort Second Half

Knowledge / Information is 'undone' successively.
For both abort path and for commit path

Propagate

(Undecide)

Applications may decide they don't need this extra information. But the link still has it for restart after failures

5 Out 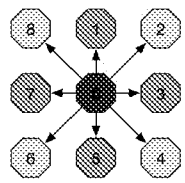 Coordiunator Issues decision
Coordinator knows if successful.
Communicates 'success vector' to cohort members:
(a) Unanimous, (b) majority, or
(c) unsuccessful (minority)
Coordinator may choose $n$ of $m$ for success

6 In 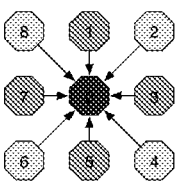 Cohort acknowledge decision

Each member of the cohort acknowledges its role and global result (decision) in $P[c_1, c_2, c_3, c_4, c_5, c_6, c_7, c_8]$

Forget

(Unvote)

7 Out 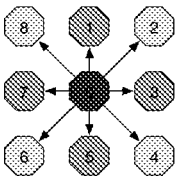 Cohorts told to "forget' transaction
Knowledge Cleanup

8 In 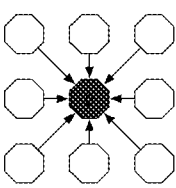 Cohort's forgotton
Knowledge Cleanup
Cohorts notify transaction forgotten (window closed for cohorts)

Performance optimizations that miss steps now know what safety guarantees are at risk in the transaction

None 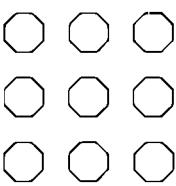 Node forgets transaction
Knowledge forgotten by coordinator (window closed for coordinator)

FIG. 8 cluster multicast can occur on up to 8
one hop neighbors in parallel

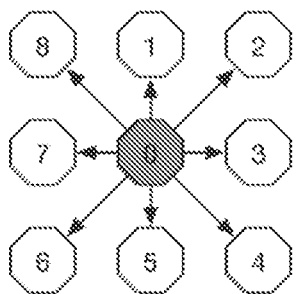
(a) Coordinator initiates Parallel messages
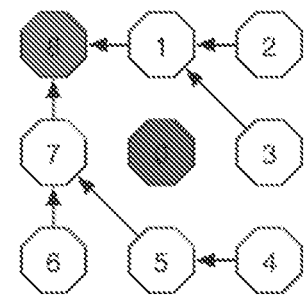
(b) Coordinator Failure Recovery on tree of preselected cell
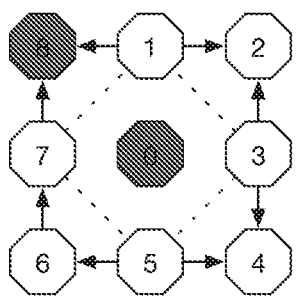
(c) 2nd Failure Detection
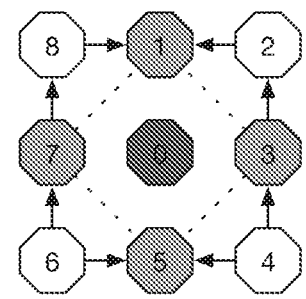
(d) Recovery by election 1 (Paxos)
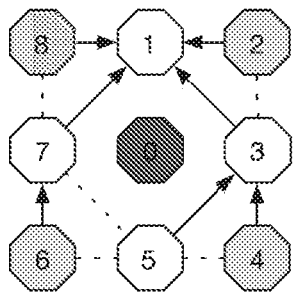
(e) Recovery by election 2 (Paxos)
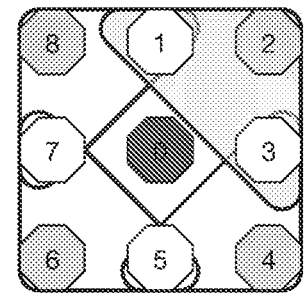
(f) SubTile Triple Alternatives
FIG. 11

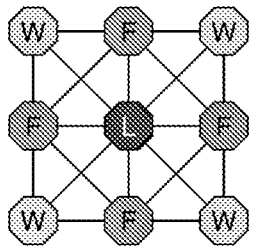

Self Cell is leader (L)
Neighbors are followers (F)
Followers may be cohort members or witnesses (W)

Leader has 2,4,6 or 8 cohort members (forming 3,5,7,9) consensus tiles (a) Basic 3 x 3 Consensus Tile

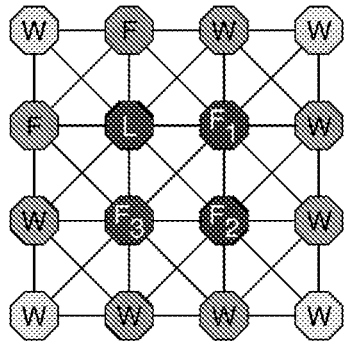 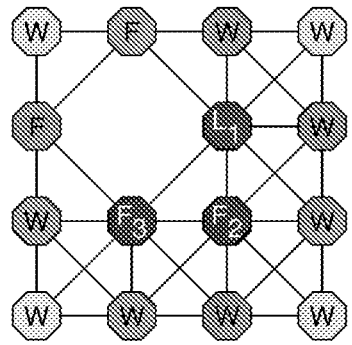

Preselected follower takes over if leader fails (b) 4 x 4 Consensus Tile

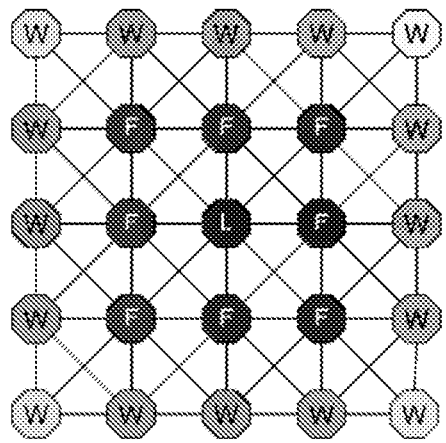

Flexible Consensus 1-hop neighbors may be cohorts, witnesses, or non-participants Dense Graph of Inexpensive Connections (DGIC)

(c) 5 x 5 Consensus Tile

FIG. 19

GENERALIZED REVERSIBILITY FRAMEWORK FOR COMMON KNOWLEDGE IN SCALE-OUT DATABASE SYSTEMS

CROSS-REFERENCE TO RELATED APPLICATIONS

This application is a continuation of U.S. patent application Ser. No. 16/694,054, filed Nov. 25, 2019, and entitled "A GENERALIZED REVERSIBILITY FRAMEWORK FOR COMMON KNOWLEDGE IN SCALE-OUT DATABASE SYSTEMS," which claims the benefit under 35 U.S.C. § 119(e) of U.S. Patent Application Ser. No. 62/773,558, filed Nov. 30, 2018, and entitled "GENERALIZED REVERSIBILITY FRAMEWORK FOR COMMON KNOWLEDGE IN SCALE-OUT DATABASE SYSTEMS", by Borill; and is related to: U.S. patent application Ser. No. 16/162,632, filed Oct. 17, 2018, and entitled "CLASSIC IMPLEMENTATION OF QUANTUM ENTANGLEMENT IN DATACENTER NETWORK DESIGN," which claims the benefit under 35 U.S.C. § 119(e) of U.S. Patent Application Ser. No. 62/573,196 filed Oct. 17, 2017 entitled "CLASSIC IMPLEMENTATION OF QUANTUM ENTANGLEMENT IN DATACENTER NETWORK DESIGN," U.S. Provisional Application Ser. No. 61/846,602, filed Jul. 15, 2013, and entitled "EARTH COMPUTING," U.S. Provisional Application Ser. No. 61/893,285, filed Oct. 21, 2013, and entitled "FRAMEWORK FOR EARTH COMPUTING," and U.S. Provisional Application Ser. No. 61/913,302, filed Dec. 8, 2019, and entitled "EARTH COMPUTING, VARIOUS EMBODIMENTS METHODS," and U.S. Pat. No. 8,259,620 B2 entitled "SELF-HEALING COMMUNICATION TREES" issued Sep. 4, 2012. All of the above-listed U.S. Patents, U.S. Applications and Provisional Applications are incorporated by reference herein in their entirety.

TECHNICAL FIELD

This invention generally applies to computer systems and, more specifically, to transactions in databases, key-value stores, and distributed systems in general, where atomic commitment or consensus is a part of the system implementation.

SUMMARY OF THE DISCLOSURE

The disclosure herein presents systems, methods, and non-transitory computer-readable media. Various embodiments described herein are implementable over a distributed network architecture over a data communication network. Some implementations can be a PC, a laptop, a server blade, a smartphone, a tablet computer, or the like. The devices can be operating over a cellular network or a wide area network, for example.

Committing a transaction in a distributed database requires that all participants agree on the outcome, i.e., achieve Common Knowledge (CK). Database systems today are inefficient because the CK resides in the application, and the overhead of protocols and software system components between the network and the application is complex, unreliable, and slow; due to the way modern networks are constructed and maintained.

The reliable management of CK is an unresolved problem in modern datacenters. By combining the entangled link protocol (Earth Non-Time Liveness (ENTL), and Transaction—Earth Non-Time Transaction (ENTT)), described in prior disclosures, on a Cellular Fabrix (CF)—a Dense Graph of Inexpensive Connections (DGIC), we construct 'consensus tiles'—a tiled pattern of tightly knit communicating cells (servers) operating as a computational unit of, for example, 9 cells on the CF in a datacenter rack.

The ENTL protocol maintains liveness using a circulating causal token in communication Links. The ENTT protocol harvests these circulating causal tokens to provide Atomic Information Transfer (AIT), allowing real information in the form of an atomic token to be transferred (reversibly) from one side of the link (Alice) to the other (Bob). The protocol is guaranteed to fail 'off-by-one' in the information state, such that each side of the link 'knows' within the scope of 'exactly once' what the state of the link is on the other side. This scheme enables atomicity under all known (and potentially many unknown) failure hazards.

The ENTL protocol may be extended to maintain (in a 'pseudo' entanglement state)—a liveness relationship between an application on one computer, through various functional layers in the operating system, driver and network firmware, through to an application on another computer, such that an application sending an atomic token is unable to 'observe' the completion of the transaction, unless the receiving application has consumed it, and the receiving application is unable to flush knowledge of the atomic token unless the sending application has been notified that it has been flushed. The ENTL protocol may be recursively extended with additional protocol elements to carry recursively larger atomic data structures. (i.e., using larger matrices to define the 'Element of Shared Information' (ESI)) associated with the link.

This is known in the computer science literature as the 'Common Knowledge' (CK) problem, with its associated impossibility result. In this invention, we circumvent this impossibility result with the Generalized Reversible Framework (GRF), where CK is 'successively' constructed to set up the entanglement of these atomic tokens and is then 'successively' torn down to gracefully return to the simpler (ENTL) entangled state. We use the word successive to imply a process of 'backing out' of the transaction without overwriting (erasing) information that would allow the transaction to reverse, should an error occur, or an application wishes to 'undo' a transaction or a sender wishes to defer it for some reason.

Going deeper into each side of Alice or Bob will reveal more structure in the CK. The GRF enables various forms of CK to be distributed within distinct layers of the system; such that only that CK which must interact with the application is required to reach the application and that CK which is needed only for recovery processes can be processed by lower layers of the system, such as in the Network Interface Controller.

The Cellular Fabrix+ENTL/ENTT is an infrastructure substrate that can be applied to many problems in distributed systems, such as consensus, atomic broadcast, k-set agreement, atomic commitment, distributed counting, logging, debugging, etc. Conventional transaction protocols such as two-phase commit (2PC), three-phase commit (3PC), Paxos and Raft work well over the CF without modification.

This architecture and protocol simplifies and builds on conventional consensus protocols, such as Paxos, and is intended to provide an advantage for in-memory Databases that use, in addition to conventional DRAM for memory, NV-DIMMs for non-volatile storage, and DIMMs that are integrated with programmable logic devices, such as FPGA's, that can be programmed to carry out simple memory operation primitives such as matrix transformation, on which the reversible ENTT protocols are built. These technologies are capable of lower latency, overcoming the delays of conventional network-based switches while providing substantially higher system-level robustness for distributed systems.

Conventional I/O subsystems and network protocols in particular present significant challenges to scaling out systems. Scaling out is preferable to scaling up because to scale-out can employ lots of inexpensive machines, whereas scale-up requires exorbitantly expensive hardware beyond the reach of most customers. Even for customers who can afford it, scale-up systems still represent a single point of failure (SPoF's), which inhibits availability, and exhibit unnecessary susceptibility to disasters (fire, flood, attacks) as well as cascading system failures.

This novel combination of these Link protocols, within a 'Cellular Fabrix' (CF: a directly connected mesh of 'near neighbor' computers) connection scheme, has many advantages over a conventional switched network, e.g., Spanning trees composed of these links will not exhibit out-of-order or duplicated packets (simplifying code). Consensus tiles have a deterministic first failover, avoiding the dueling leader's hazard.

Paxos is often preferred over 3PC because it can handle network partitions better. However, because the CF is a dense graph of inexpensive connections (DGIC), it will experience a partition only under the most extreme conditions. Analysis and simulations show that 40% of links need to be deleted randomly before a partition occurs. Even then, the system can continue with the resilience of conventional Paxos and the mergeability of CRDT (Conflict-Free Replicated Data Types).

Raft uses randomized timeouts. Because the Cellular Fabrix ENTL protocol replaces timeouts, we can simply replace them with the ENTL link failure detector—or just leave the code as it is, knowing it will never be exercised. TCP/IP represents a similar situation. Fail-overs will occur in the Cellular Fabrix, but TCP will never experience dropped, delayed, duplicated or reordered packets. The vast majority of recovery code in TCP will never be exercised. This is important too, say, Zookeeper, which uses TCP for in-order delivery—unlike most Paxos implementations, which use UDP.

Conventional consensus algorithms such as Paxos arrange to come to a consensus about a sequence of committed events, across a collection of computers, via asynchronous messages, without reliable clocks or a perfect network. In this context, 'Consensus' implies a process that is regarded by current practice to be irreversible. Irreversibly makes it highly complex and error-prone to reason about transaction protocols, and tradeoffs between performance and safety have become an ad-hoc art. Many Databases have proven repeatedly to show data loss during temporary network partitions.

In contrast, this invention describes a symmetric and reversible sequence of growth (and decline) of Common Knowledge on each side of the link, with a peculiar property: what grows on one side declines on the other, and visa-versa. This allows us to use the Element of Shared Information (ESI), managed by the Link, and compose multiple links into a consensus set to manage CK on application trees which overlay the connection graph.

One aspect of this approach is that this protocol allows an arbitrary number of 'reversible' tokens to be maintained in the reversibility zone on each side of a link (Alice and Bob). We anticipate that this Conserved Token Property (CTP) can be turned into a valuable resource for provisioning, managing, and accounting in distributed systems.

By managing Common Knowledge in the link, we can accelerate scale-out databases in many unexpected ways. E.g., managing Common Knowledge in the link enables transactions to achieve higher resilience with less CPU and communication overhead: e.g., Three Phase Commit (3PC) resilience with:

Two-phase (2PC) (existing) overhead—with changes to the configuration.
One-phase (1PC) overhead—with changes to the database.
Zero-phase (0PC) overhead—with changes to the application. (Fire & forget+flow control).

Two-Phase Commit (2PC) does not have safety proof because of the particular failure mode that occurs when the leader and a member of the cohort both fail at a particular point in the protocol. When the member of the cohort comes back up, it doesn't know if it is committed. 2PC is a blocking protocol. If the coordinator fails, there is no mechanism to restart the protocol from one of the remaining members of the cohort. [Gray/Lam port] "Two-Phase Commit is the trivial version of Paxos Commit that tolerates zero faults".

This particular failure mode is handled by the Generalized Reversibility Framework (GRF) as follows: The consensus tile is implicitly a consensus mechanism where any participant may discover that failures have occurred and either take over the protocol (reversibly and successively to a known good point) if it is a preselected failover partner or initiate an election among the remaining participants if it is not.

The GRF subsumes Zero Phase Commit (0PC-1 message), One Phase Commit (1PC-2 messages), Two-Phase Commit (2PC-4 messages) Three-Phase Commit (3PC-6 messages)—or however many levels of N-Phase-Commit that is required to completely specify the buildup and teardown of Common Knowledge to match application needs.

Some applications, such as nuclear missile launch may require complete and uncompromising safety. No loss of CK can be tolerated under any imagined failure scenario. Intermediate applications (e.g., low-value bank transactions) may choose to trade off performance for some probability of a rare failure within an acceptable 'cost of doing business. Other applications, such as metering of resource usage by tenants and their applications (VMs, Containers, or Lambda's), may require transactionality (because the customer is being billed), but the penalty of error is statistically insignificant. By making microtransactions cheap (i.e., low overhead and high performance), they can be used everywhere.

This invention enables application and database programmers to distinguish between which CK-carrying protocol handshakes must occur between applications (in the irreversible zone), and which could occur between lower levels, such as the Computation Asset Layer (CAL), Data Asset Layer (DAL), or Network Asset Layer (NAL) which reside in the 'reversible' zone of the infrastructure. The ultimate realization of which would be having all low-level (liveness management, flow control and token watchers) managed in the Link itself with no overhead whatsoever experienced in the main processor (driver and above), unless an irrecoverable error has occurred.

Additional (intermediate odd-numbers) handshakes may be exploited to perform optimizations. There is no requirement for the number of CK-carrying protocol handshakes to be even, especially when some of them can be hidden in the Link. For example, with flow-control, all the sender needs to know in order to proceed is if the previous transaction got through before requesting the next. If the previous transaction is unresolved, it will either block the next try Commit operation or return a Commit Pending response. This will be one of many options the sender can specify for the operation in the API.

The automatic failover in the Cellular Fabrix at the Link level means that conventional heartbeats and timeouts are no longer necessary.

Conventional database transactions are in a constant state of flux: trading off performance and safety. An empirical approach is often taken by implementors by introducing the 'knowledge balance' principle, an invariant that can be verified in a running system, we can more easily prove the protocol works generally rather than just in the case-by-case analysis of hazards that we can think of. The knowledge balance principle is implemented as the 'Token Conservation Property'. Where the Tokens are extensions to the Atomic Information Transfer (AIT) protocol in the previous disclosures, equipped with additional mechanisms (for example, to introduce serializability), and decorated with application state.

A particularly difficult problem in transaction systems is that one or more participants are unable to back out of a transaction once it has been decided. This 'unresolved transactions' problem is addressed by the GRF; by explicitly enabling internal and external reversibility in the link, we successively reverse the protocol (a single state machine across the link), where we guarantee both sides are now in agreement, and then proceed forwards again, this time hopefully without the error being encountered, and successfully complete the transaction without the application or database even knowing that there was a problem.

Single-State Machine vs. Replicated State Machines: In a conventional network, each side of a link has a separate state machine that is supposed to be kept in sync with the state machine on the other side. In such a network, say that L (left) has just sent an event to R (right) and receives an event from inside its node. L's state machine will make a transition to a new state, potentially generating an event.

In the EARTH Computing network, there is a single (ONE) state machine spanning the two sides of the link. Say that L has just sent an event to R. It cannot respond to an event from anywhere except from R. Once L receives the event from R, L transitions to a state where it can respond to the other event. The distinction is that the EARTH system is discrete in the sense that, L having sent an event to R, the state machine on L makes no transitions until an event is received from R.

In a conventional network, each side of a link has a separate state machine that is kept 'in sync' with the state machine on the other side. In such a network, say that L (left) has just sent an event to R (right) and receives an event from inside its node. L's state machine will make a transition to a new state, potentially generating an event.

In the EARTH Computing network, there is one state machine spanning the two sides of the link. Say that L has just sent an event to R. It cannot respond to an event from anywhere except from R. Once L receives the event from R, L transitions to a state where it can respond to the other event.

The distinction is that the EARTH system is discrete in the sense that, L having sent an event to R, the state machine on L makes no transitions until an event is received from R.

Taking this one step further, we can take this mechanism outside the link, into the NAL, DAL or CAL, and maintain 'reversible work tokens'. Whereas the link considers the NAL as outside its reversibility zone, and the NAL considers the DAL as outside its reversibility zone, and the DAL considers the CAL as outside its reversibility zone, and these relationships can go on indefinitely. In practice, we would consider the interface between the CAL and the database/application to be the final edge of what we can count on as a reversibility zone. This means, however, that transaction requests and workload management (such as application load balancing, resharding, re-indexing, and response to attacks (such as DDoS), can be managed by the rich structure now possible in the reversibility zone. Not only can the target 'return' the transaction if its queues become big, but the lengths of the queues can be back-propagated to the sender, allowing it to pull back work tokens it had issued and re-issue them across the available hardware resources in a distributed system dynamically.

Comparing with (EasyCommit: "leverages the best of twin worlds (2PC and 3PC). It is non-blocking (like 3PC) and requires two phases (like 2PC)". The two key insights that enable achieving the non-blocking characteristic in EasyCommit are: (1) (first transmit and then commit) to delay the commitment of updates to the database until the transmission of a global decision to all the participating nodes. (2) Induce message redundancy. EasyCommit does this by ensuring that each participating node forwards the global decision to all the other participants (including the coordinator).

The principal differences with EasyCommit, and this invention are: (1) This protocol is reversible. (2) This protocol is hosted as a logical overlay on the Cellular Fabrix, which allows direct connections among the cohort to occur naturally (instead of through a network of switches). (3) The decision in each member of the cohort—to either commit or abort—is now placed in a state of superposition, where the distributed system is ready to make a decision, and the coordinator (or its failover partner) collapses the superposition by forcing a decision—e.g. the coordinator decides, or a member of the cohort triggers recovery when it notices something wrong. (4) the Cellular Fabrix has the advantage that all logically independent communications can be physically independent communications, on the links (ports on the cells and cables between them). This provides increased resilience for consensus tiles against communication failures and improved parallelism (more messages can communicate concurrently). (5) Packets to initiate the vote, and responses from the votes, no longer need to be queued up behind each other on the inputs and output channels of the coordinator. (6) This invention provides an arbitrary number of intermediate software/hardware elements between the coordinator and each member of the cohort, whereas EasyCommit provides only one.

Consensus tiles are natural majority voting systems. But a majority of what? Certainly, a coordinator can select its cohort (and a number of participants) up front, and then one or more of them may fail. By using this combination of the Cellular Fabrix and the Link protocols, knowledge of membership can now be fully dynamic. By using the conserved quantities CQ/EQ exchanged quantities property, this enables selected members (e.g., the coordinator and one or more triples) of a consensus set to be informed unambiguously of any change membership, including an immutable log of joining and departing members, which can be an aid to recovery.

EasyCommit is one of many optimizations that fit within the Generalized Reversibility Framework (GRF) represented by our reversible Link protocol and the reversibility zone (described in the layers of FIG. 5). One important distinction with respect to optimizations is that they can be represented as subsets of the GRF Protocol described in FIG. 6. Rather than describe the ad-hoc nature of the optimization in the 'implementation' language of their authors, we instead relate to the more general mechanism of a symmetric and reversible Common Knowledge (CK) growth and removal in an appropriate protocol such as ENTL/ENTT.

We can see with the consensus tile described previously the communication paths enabled by the Cellular Fabric allow direct, unhindered communication between cohorts, even when the coordinator AND one of the participating cohorts have failed. If the coordinator fails unexpectedly, the consensus tile has 4 triangles of cohorts (1 triangle on each corner), which can communicate with each other within the triangle to "notice" that the coordinator cannot be reached. Moreover, on the CF configuration, the protocol can survive simultaneous failures of the coordinator and multiple members of the cohort. Even if some of the members were not participating in the transaction but were just observing (witnesses in our terminology), they can still be learners (in the Paxos terminology) and take action when failures occur. More importantly, this can all be done in the link—for learners—because learners don't need to get their applications involved—at least not unless a failure occurs and they change roles to either (replacement) coordinator or (new) participant.

Consensus tiles allow each participating node to forward the global decision to all the other participants on their own private links within the triangles, as well as back to the coordinator. This 'parallelism' provides significant additional resilience without any impact on performance (in a similar but more effective way to the EasyCommit paper.

Entangled Links (henceforth Links) exploit a unique combination of physics, electrical engineering and computer science. AIT can be thought of as the distributed systems (message-passing based) equivalent of the atomic Compare And Swap (CAS) primitive used in shared memory architectures. The result is an event-only (timeout-free) messaging with strong liveness, recoverability and security properties. Examples of the benefit they provide for 2-phase commit, and for the Paxos algorithm include:

[Two-phase commit] The prepare phase is asking if the receiving agent is ready to accept an 'indivisible token'. This serves two purposes: communication liveness and agent readiness. By providing the communication liveness test and avoiding blocking on agent ready by having the link store the token on the receiving half of the link. If there is a failure, both sides know; and both sides know what to do next.

[Paxos] "Agents may fail by stopping and may restart. Since all agents may fail after a value is chosen and then restarted, a solution is impossible unless some information can be remembered by an agent that has failed and restarted". The assumption is when a node has failed and restarted, it can't remember the state it needs to recover. With AIT, the Link can tell if the state is to recover from because the token (under the ENTL (liveness) protocol and ENTT (Transaction) protocol), will always be in a complementary state to the other side of the Link.

Both AIT and 2PC/3PC attempt to do reversibility; but in very different ways:

For 2PC/3PC Rollback reset the clock to a previous instance in time (only measure time in this sequence of stable instances).

In conventional transaction technology, 'Undo' and 'Abort' are different. Abort is very coarse grained. Every Undo step is an intermediate commit point.

In the GRF, Transaction Forward and Transaction Reverse are symmetric, and Abort and Commit are treated the same. This symmetry, enabled by the successive reversibility mechanism, enables invariants such as the Token Conservation property, which can simply reason about the tradeoffs in not having, or overwriting knowledge in the transaction The GRF replaces irreversible notions of transaction commit and aborts with a reversible protocol with the properties of the no-cloning theorem. i.e., Atomicity modeled after fundamental physics.

There is a particular stage (the first or second) of 3PC which can be accelerated by keeping the handshakes within the link without requiring modifications to legacy applications or databases since this operation does not involve any actual data manipulation. This provides a way to speed up a conventional 2PC message involvement while achieving 3PC resilience. We also eliminate the timeouts that 3PC would otherwise need on a conventional network.

In the bigger picture, the basic idea of the Generalized Reversibility Framework (GRF) is that the Coordinator can entangle a token at the participants (members of the cohort) with a complementary set of tokens within itself in a single prepared message.

When N of M nodes has confirmed entanglement, the cell agent triggers, sending a message to all the prepared tokens to go ahead. If additional $<N \leq M$ messages come back, they are notified that their services are no longer required. Transaction liveness is achieved in the consensus tile when $>N$ nodes are ready. Only some subset (R—a number pre or post-selected by the coordinator) are required to keep the database within its chosen tolerance for inconsistency. The process can be pipelined.

As the coordinator waits for either all or some subset of its cohort to report back, the cohort members can independently (and concurrently) communicate with each other on their direct connections on the Cellular Fabrix. This provides additional resilience when multiple failures occur because no individual failure in a link, or cell, or process, will be able to block the concurrent sharing of CK among the cohort. If any member of the cohort sees an error from any other member of the cohort, it can communicate this to the coordinator, and among the cohorts, it is connected to.

Three Phase Commit is non-blocking, but it still needs a timeout in conventional networks. In one aspect of this invention, when hosted on a Cellular Fabrix which uses Links, conventional heartbeats and timeouts are no longer needed.

AIT is atomic. The protocol (described in previous disclosures by the inventor) guarantees that the Token cannot be observed in an inconsistent state in a bipartite (two party) system. Applications (at Alice and Bob) will see the token either on one side or the other; not both, and not neither. This invention makes this observability criterion an invariant for three or more parties involved in the transaction.

Serializability—the AIT tokens can be equipped with additional mechanisms, for example, data structures, in the coordinator (or it is NIC/NAL) representing (say) 8 cohorts that reflect the minimum necessary CK for the transaction. The coordinator will be first to have a God's-Eye-View (GEV) of the transaction and can then forward that information so that all the cohorts have it. If the coordinator desires the transaction to be composed of multiple parts (some of which relate to the semantics of the database/application), it can decorate this GEV CK data structure with a specification for the desired serial order and/or, can check to see if the serial order has been achieved, and instead of aborting and retrying the whole serializable transaction, can 'repair' one part of the transaction by reversing one leg of the consensus tile, by asking it to undo its operation (by going backwards successively to some correct point in the computation), and then telling it to go forward again to retry its part of the transaction, with this new GEV CK.

An engineer familiar with the implementation of databases will be able to take this pattern and implement various alternative implementations and optimizations.

Internal and external reversibility provides a more flexible solution: by removing the constraint 'cannot back out of commit once decided', the reversibility zone can accommodate a more flexible resolution to addressing failure hazards of this kind.

Moreover, by adopting the principle of knowledge balance (a superset of the principle of information conservation adopted in other areas of computer science and communications and the CQ/EQ principle in previous disclosures), our solution is more likely to be complete and easier to prove. This invention focuses on the mechanisms required in the communications between servers (cells) in a cluster of (say) 9 cells to ensure this invariant is maintained throughout all communications, failures and recoveries and to enable verifiability in simulation and systems deployed in production.

BRIEF DESCRIPTION OF THE DRAWINGS

For a more complete understanding of the invention, reference is made to the following description and accompanying drawings in which:

FIG. 1 The consensus tile is a set of (say) 9 Cells, each directly (one ENTL/ENTT hop) connected to a self-cell (which can distinguish itself from its 8 neighbors). The Cellular Fabrix is a mesh of cells with valency 8+that corresponds to local connections in a datacenter rack;

FIG. 8 Cohort (b)—Second set of phases. Tearing down the knowledge in the link in order to make the transaction 'irreversible';

FIG. 11 Consensus/Failover—Consensus Tile with two failures and failover. Any cell in the tile (1-hop neighbor) is able to recover if the coordinator fails. Recovery node is either preselected by the center coordinator OR is subject to voting in several different approaches. The protocol can handle arbitrary failures as long as at least one cell remains;

FIG. 18 Link3-1-Phase Message Protocol using Common Knowledge in the Link, which can provide additional Common Knowledge (CK) exchanges after the AppAlice and AppBob messages have gone through;

FIG. 19 (a) shows the basic 3×3 Consensus Tile. Self-Cell is leader (L) Neighbors are followers (F). Followers may be cohort members or witnesses (W). The Leader has 2, 4, 6 or 8 cohort members (forming 3, 5, 7, 9) consensus tiles. FIG. 19 (b) Similar situation 4×4 cells now with a self-chosen leader and three followers. Shows followers who can perform a recovery in order of priority (preselected by Leader). (c) 5×5 Consensus Tile with all 1-hop neighbors as followers and 2-hop cells as witnesses;

FIG. 25 Alternative description 2 a: Single Message Transfer Using Link Facilities.

FIG. 26 Alternative description of the above protocols depicting Interlocked Transactions;

DETAILED DESCRIPTION

Figure 2:
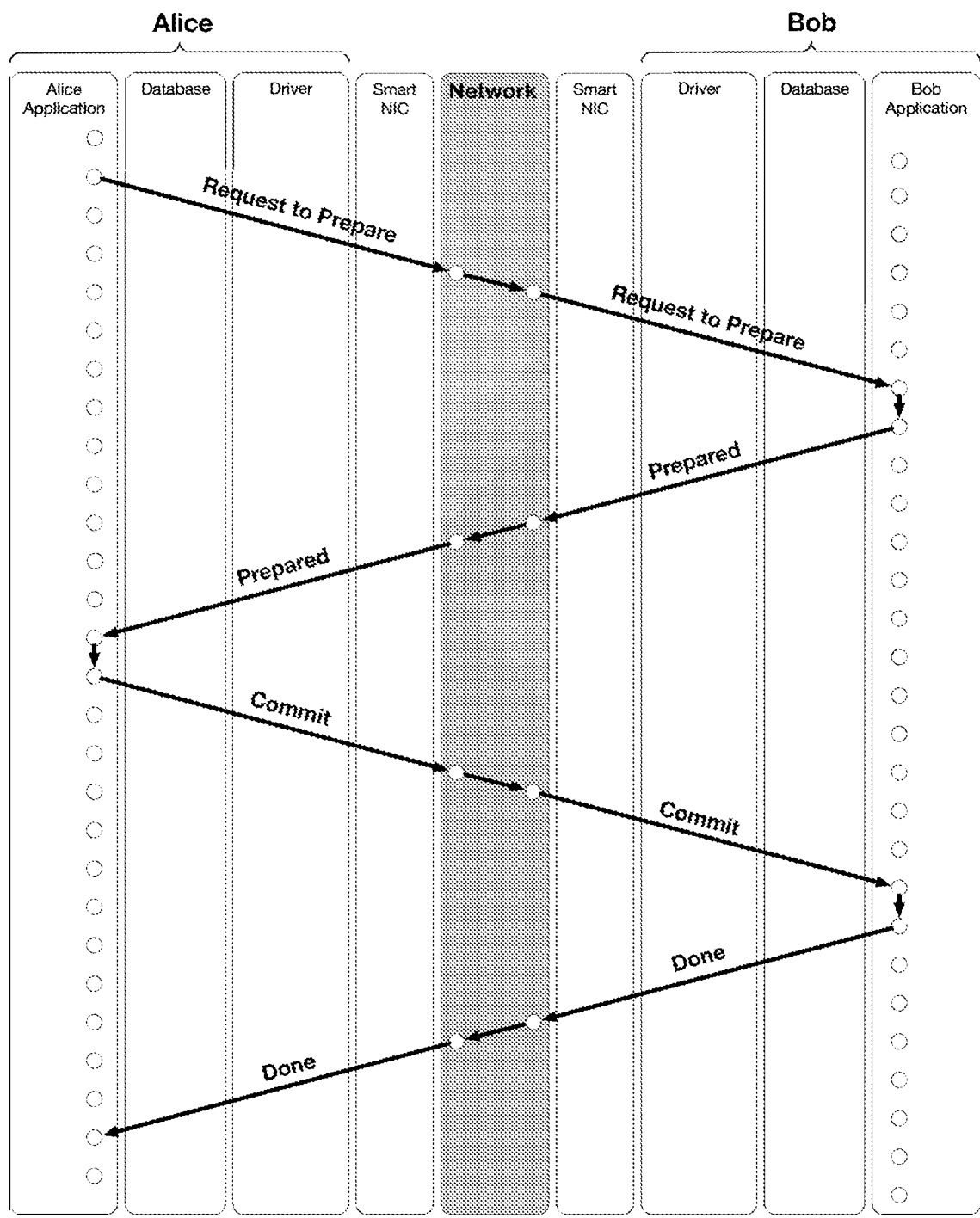
FIG. 2 compares a conventional (2PC) protocol, where Common Knowledge is all managed in the Database/application; and the Cellular Fabrix, where the Common Knowledge is managed in the Link.

Many problems encountered in datacenters today arise from our inability to distinguish between a node that is merely slow from a node that has failed or become unreachable due to a network failure.

We take the two most recognizable elements in datacenters today: servers and switches, and refactor them into simpler, more foundational elements (fully independent failure domains): cells and links. A cell is a single type of node element (autonomous unit of computing, storage and packet processing). A link is an individual, bidirectional, computation object (an autonomous communication entity between two cells)

Links may be thought of as 'compute elements' which oversee their own autonomous and independent failure domain; comprising the cable and NICs on both ends, which form their own self-contained execution environment. In the same way devices within a single execution environment are considered a single failure domain; the link can detect device and cable errors and either repair (route around) the failure or stop the machine.

A consequence of the former is that unifying node elements makes things simpler because we have only one type of node to manage instead of two. The consequence of the latter is profoundly more interesting: we raise the notion of a link to first order—a first-class citizen in the infrastructure—a bipartite element of information with two complementary halves—persistable through failure and recovery events. i.e., a communication object that doesn't rule out that some fault-detection and computation is involved.

An example link utility is The I Know That You Know That I Know (TIKTYKTIK) property; which enables us to address some of the most difficult and pernicious problems in distributed systems today.

Another example link utility is Atomic Information Transfer (AIT). Unlike replicated state machines used throughout distributed applications today, synchronization of timing domains in computers generally starts from the processor clock on the motherboard and fans out through the logic into the I/O subsystems. AIT is the link between two computers, and although it receives information from either side, it is not synchronized to either side. This "deep asynchronous domain" enables failure-independence and atomicity.

Links are single state machines that span both sides of the link: the two halves of which maintain temporal intimacy through hidden packet exchanges. When a local agent or actor is ready, the AIT protocol transfers indivisible tokens across the link to the other agent atomically (all or nothing). Links are exquisitely sensitive to packet loss. This is intentional: we turn the FLP result upside down and use a single failed process to guarantee the atomic property for AIT.

These TIKTYKTIK and AIT properties are composable. Trees of links provide a resilient conserved quantities mechanism to reliably distribute tokens among agents on an application graph. Intermediate cells promise never to lose AIT tokens. This defends against lost tokens because if any part of the chain (or tree) breaks, alternate paths are available to seamlessly recover the conserved quantity and continue operation.

By strengthening the system model, links and AIT provide a general foundation to solve many distributed systems problems, such as failure-detection, consensus and distributed transactions.

Links also provide a more reliable foundation for distributed system services for applications: consensus, atomic broadcast, leader election, and distributed arithmetic, which, in-turn, enable higher level functions such as network-assisted-transactions which serve, for example, distributable (scale-out), persistable (durable), and lightweight (but-accurate) accounting of conserved quantities associated with application state or resource usage.

The directly connected Neighbor to Neighbor (N2N) direct connection technology is renamed 'Cellular Fabrix' in this invention in order to more clearly distinguish it from the prior art, and to more accurately characterize its purpose and function. The term "Transaction Fabrix" is synonymous with "Cellular Fabrix."

"Cellular" is a definition (from prior inventions) intended to imply an autonomous unit of computing, storage and network capabilities. Cells are substitutable. In principle, any cell can perform any function.

"Fabrix" is a definition intended to distinguish between the term 'Fabric' used widely in the datacenter industry (particularly in association with Clos networks). It implies a set of Cells and links connected in a neighbor mesh (i.e., no separate switches or routers). Each cell participates in creating the Fabrix by building a spanning tree rooted on itself and maintaining the Fabrix for other cells by forwarding their packets on their tree and healing around (preferably to the rootward cell in the graph), via local links guided by a gradient descent algorithm.

Implementation Context

[Event Driven] Everything is event-driven. From our lowest-level protocol to the services we support and the applications we tune our tools for. We go far beyond what the industry normally means by this term: we replace all aspects of the notion of 'duration' (timeouts, heartbeats, etc.) with a purely event-only paradigm.

[Built-in Consensus] The groundplane supports 'tiled' clusters of (say) 9 physical cells (self/leader cell plus 8 cohorts connected one link away) is a cluster. At the heart (root) of every tree is a 'free Paxos'. In the Cellular Fabrix, it's there all the time, doesn't need to be turned on, and happens silently in the background by 'decorating' the ENTL packets with the state to maintain liveness and equipping the link with ENTT to transfer ownership AIT if the self-cell fails. Because there is no state transfer over multiple links, the free bandwidth on the links is used to good effect without affecting the rest of the cells in the datacenter.

Long range clusters can be stitched together with Kleinberg (or Virtual Kleinberg) links. Multiple (hierarchical) levels are provided each time a new TRAPH is stacked on top of the existing one. In this way, the logical and virtual TRAPHs can have access to a 'LPaxos' and 'VPaxos' state for transactions and ZAB operations. [Immutable Event Log] Capture changes arriving at edge cells to an immutable event 'stream'. A multidimensional data structure and associated stream(s) we call the MetaData Tensor (MDT) (Described in prior patents by this inventor) and reactively compute the derived states and materialize views from the event log.

[Fully Distributed] Not 'decentralized' or 'centralized'. In the base substrate of the system, there are no Single Points of Failure (SPoF's), or Bottlenecks. From: [On Distributed Communications—Paul Baran] "We are now living in an era in which we cannot guarantee the survivability of a single point. However, we can design systems in which system destruction requires the enemy to pay the price of destroying n of n stations. If n is made sufficiently large, it can be shown that highly survivable system structures can be built—even in the thermonuclear era.". [Neighbor to Neighbor Addressing (N2N)] Instead of Any-to-Any (A2A) Addressing. Most of todays' conventional attacks are inexpressible. The architecture is designed to be hyper-evolvable: to be able to react and evolve faster than any attacker.

[Unikernel Based Foundation] Unikernels. Unikernels are specialized, single-address-space machine images constructed by using library operating systems. Unikernels shrink the attack surface and resource footprint of cloud services. They are built by compiling high-level languages directly into specialized machine images that run directly on a hypervisor, such as Xen, or on bare metal. Since hypervisors power most public cloud computing infrastructure such as Amazon EC2, this lets your services run more cheaply, more securely and with finer control than with a full software stack. Unikernels provide many benefits compared to a traditional OS, including improved security, smaller footprints, more optimisation and faster boot times. in a Guest VM. Think of them as a single purpose, single-process virtual appliance. Statically linked image of your Application and a hypervisor (no general OS or extra library code). From a security perspective, they have a tiny attack surface: there are no extraneous services, no shell, no system calls, and no fork( ) to start additional processes.

FIG. 1 shows the consensus tile is a set of (say) 9 Cells, each directly (one ENTL/ENTT hop) connected to a self-cell (which can distinguish itself from its 8 neighbors). The Cellular Fabrix is a mesh of cells with valency 8+ that corresponds to local connections in a datacenter rack. The center (self-cell) is implicitly the coordinator for any transaction's requests received from clients. The figure shows a 3×3 (minimum) tile and a 4×4 (extended) tile—which allows for the failover of a single tile to one of four alternatives. This is a Dense Graph of Inexpensive Connections (DGIC)—Cell valencies in the range 6-12, where cells are directly connected to each other rather than a separately switched network, provide far greater resiliency. Core cells with 8+ports connected to their neighbors in a Neighbor-to-Neighbor (N2N) arrangement are effectively immune from partitions.

Figure 4:
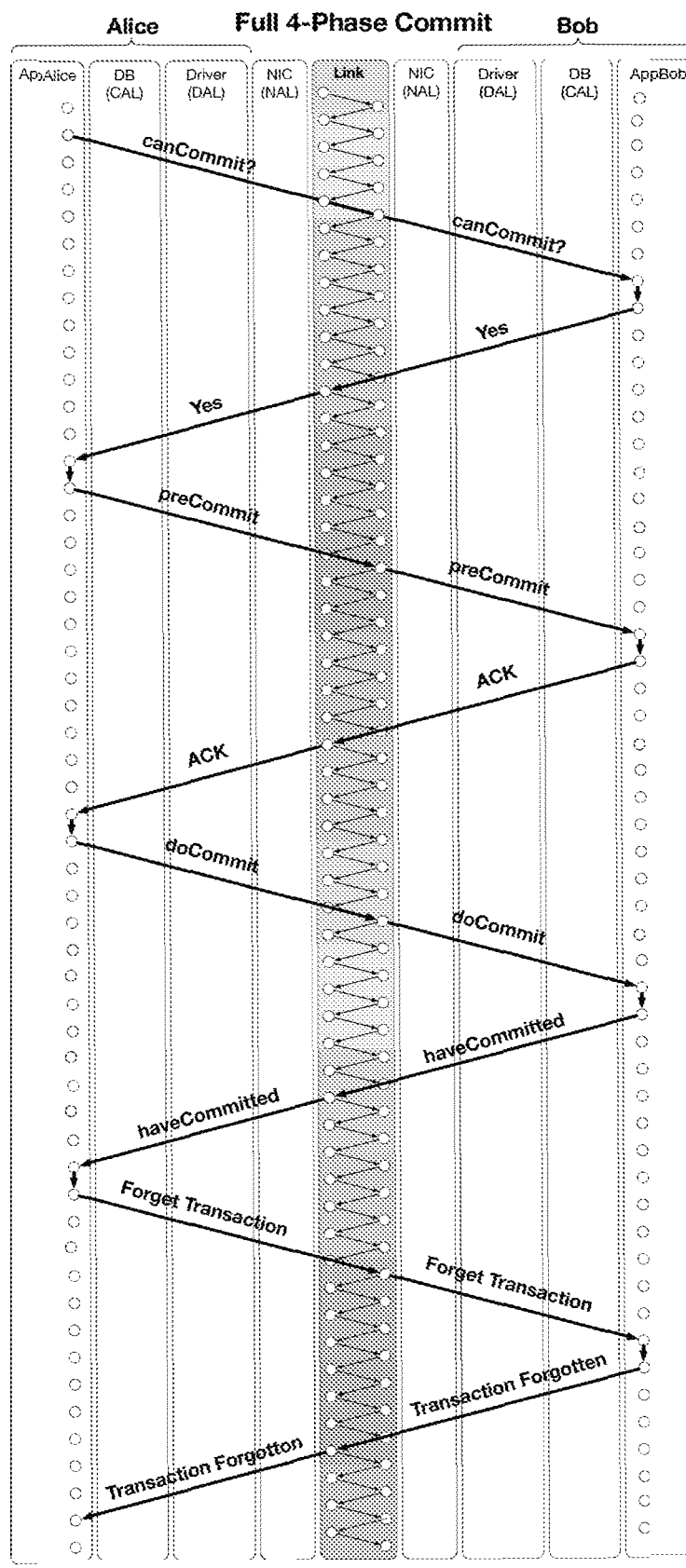
FIG. 4 Four (4)-Phase Commit. Fully reversible protocol. Common Knowledge Managed in the Database/Applications (AppAlice and AppBob)

FIG. 4 shows 4-Phase Commit. Fully reversible protocol. Common Knowledge managed in the Database/Applications (AppAlice and AppBob). The semantics do not matter. All that is important for the protocol to provide is a precise representation of the 'knowledge' that is accumulated and disaccumulated through the various phases of the reversible protocol. In this invention, the 'meaning' ascribed to the messages is irrelevant; the consistency of the lattice operations in the MetaData Tensor (MDT) provides a consistent framework for proving and verifying the invariants of the protocol.

Figure 5:
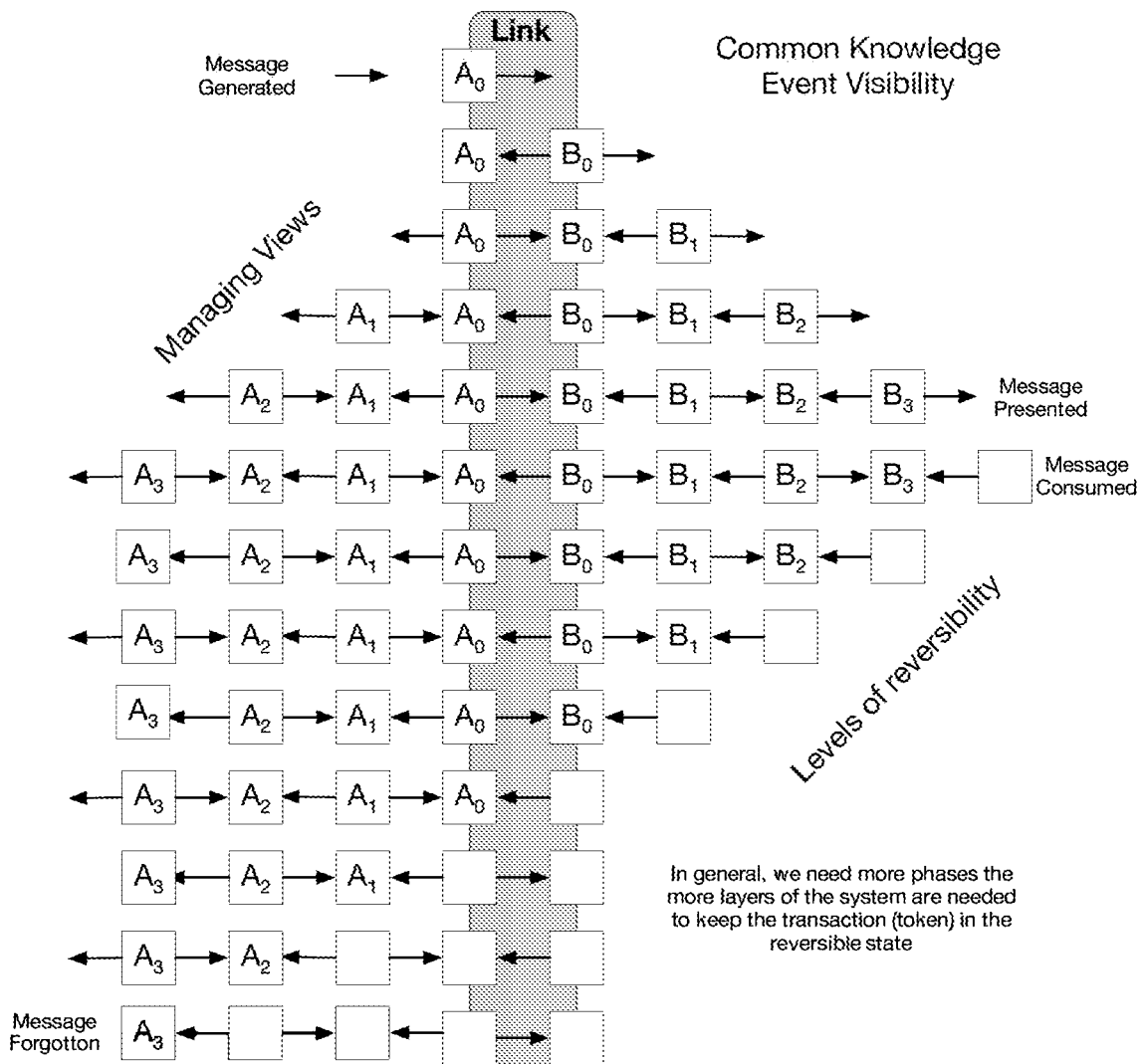
FIG. 5 Transaction Layers—Common knowledge event visibility, reversibility, and handshake phases.

FIG. 5 shows Common Knowledge event visibility, reversibility, and handshake phases in a set of transaction Layers.

Figure 6:
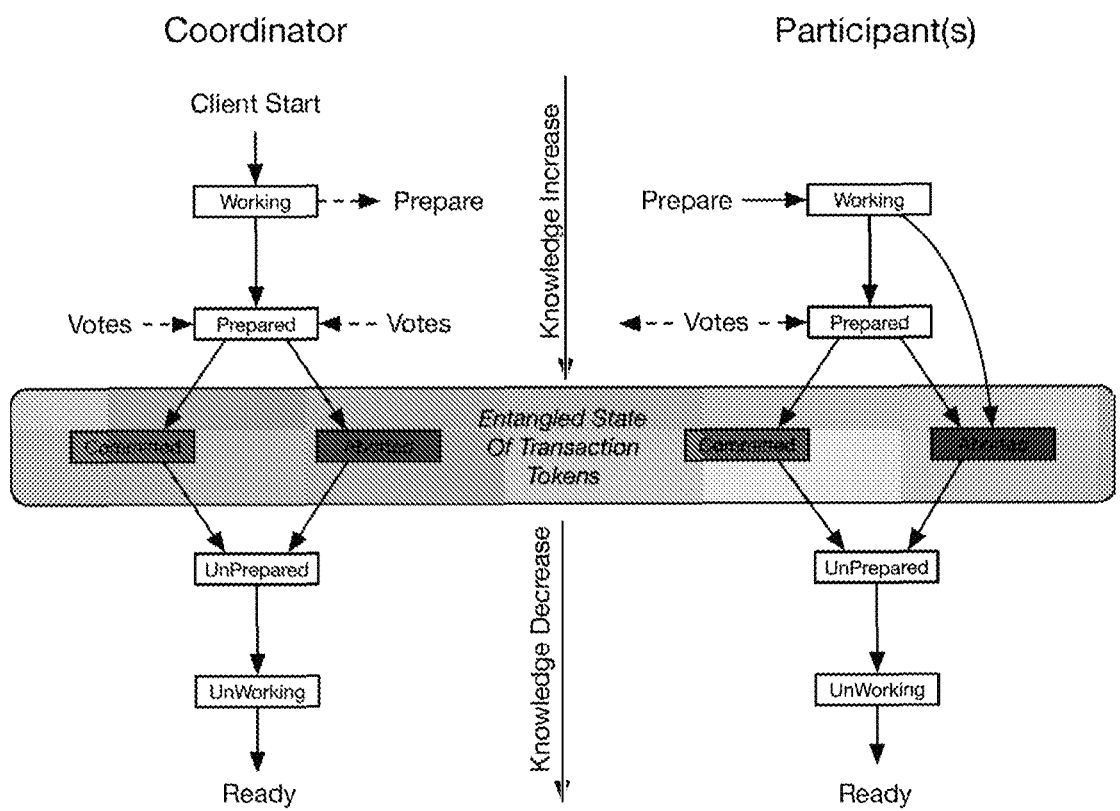
FIG. 6 Generalized Reversibility Framework (GRF). No outside observer can see neither or both tokens. It can't be observed until it is consistent, i.e., all the tokens (one on each link) have achieved 'consensus'; i.e., all have committed. Entanglement implies that we know everything that we can know about a system (i.e., the elements on both sides of the Link), however, we know nothing about each element of the link.

FIG. 6 shows the Generalized Reversibility Framework (GRF). No outside observer can see neither or both tokens. It can't be observed until it is consistent, i.e., all the tokens (one on each link) have achieved 'consensus'; i.e., all have committed. Entanglement implies that we know everything that we can know about a system (i.e., the elements on both sides of the link), however, we know nothing about each element of the link. The consensus tile protocol, therefore, ensures that if any one participant aborts (in the ALL protocol)—the globally resolved state will fail. Or (in the majority protocol), the global commit will succeed if a majority has committed. This majority is only visible to the coordinator, but participants may see the failure by lateral communications with each other on the consensus tile. A person of normal skill in the field will be able to design one or many protocols that achieves this objective once they have been introduced to this set of concepts and descriptions of the invariants they enforce.

Figure 7:
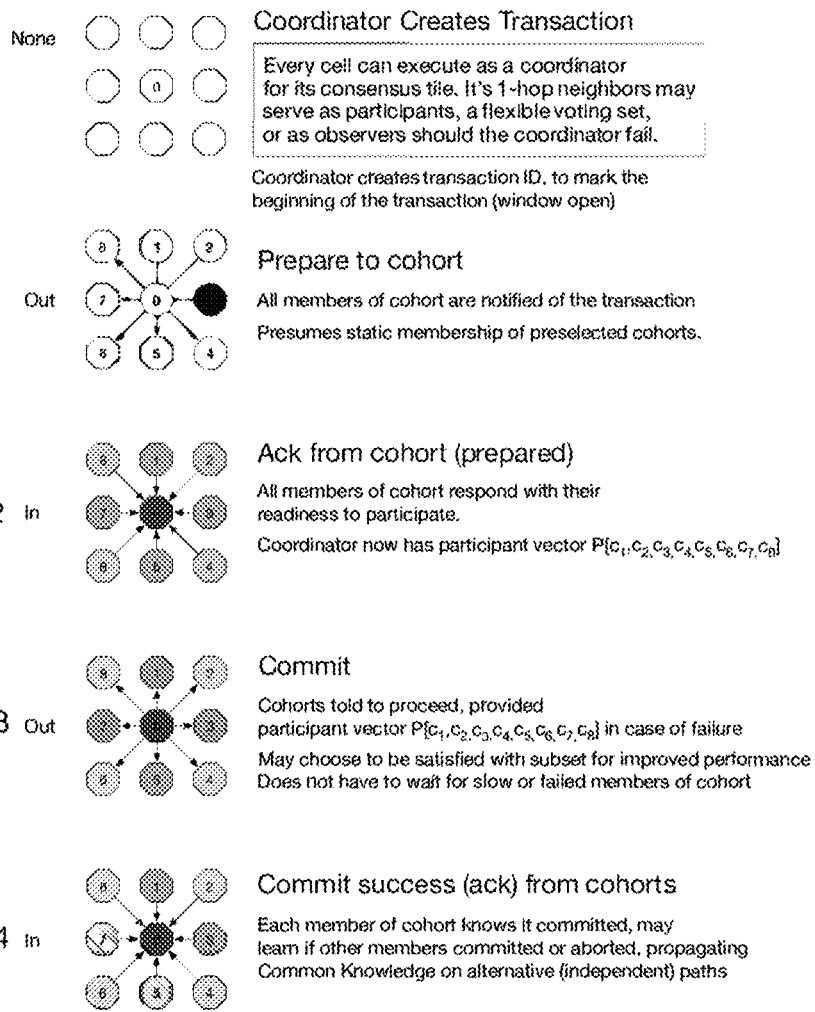
FIG. 7 Cohort (a)—Cohort in multi-phase communication. When using ENTL/ENTT links, timeouts are not required for a failure detector. This is the first set of phases—building up the knowledge in the link in order to perform an entangled transaction.

FIG. 7 Cohort (a). Multi-phase cohort communication. When using ENTL/ENTT links, timeouts are not required for a failure detector. The consensus tile has sufficient redundant events it can harvest from other ports. This is the first set of phases—building up the knowledge in the link in order to perform an entangled transaction. Note that it begins from only the coordinator having knowledge, and after various communication phases, both sides can maintain entanglement indefinitely with a simple tick-tock. The entanglement is broken by an event, typically by the coordinator who has maximum knowledge before other members of the cohort; or by any member of the cohort who detects an error or inconsistency to trigger successive reversal to a previously good state.

FIG. 8 Cohort (b) (continuation of FIG. 7). When using ENTL/ENTT links, timeouts are not required for a failure detector. The cluster has sufficient redundant events it can harvest from other ports. Tearing down the knowledge in the link in order to make the transaction 'irreversible'. Note that these phases end with all information erased in all cells and then finally being erased in the coordinator—corresponding to 'forgetting' the transaction once it has been made irreversible.

Figure 20:
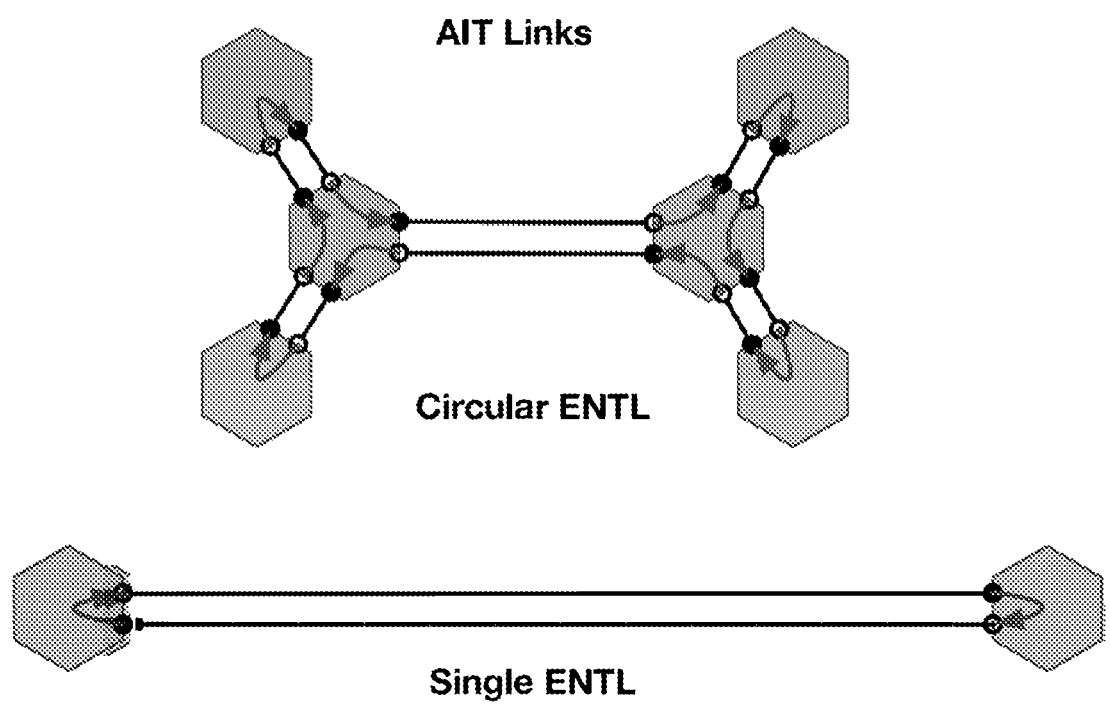
FIG. 20 (lower figure) shows an example of using a circulating ENTL Token on a single link. The upper figure shows an example of fusing a circulating ENTL token through multiple cells. Perhaps constructed by piggybacking tile tokens on top of the individual link tokens.
Figure 21:
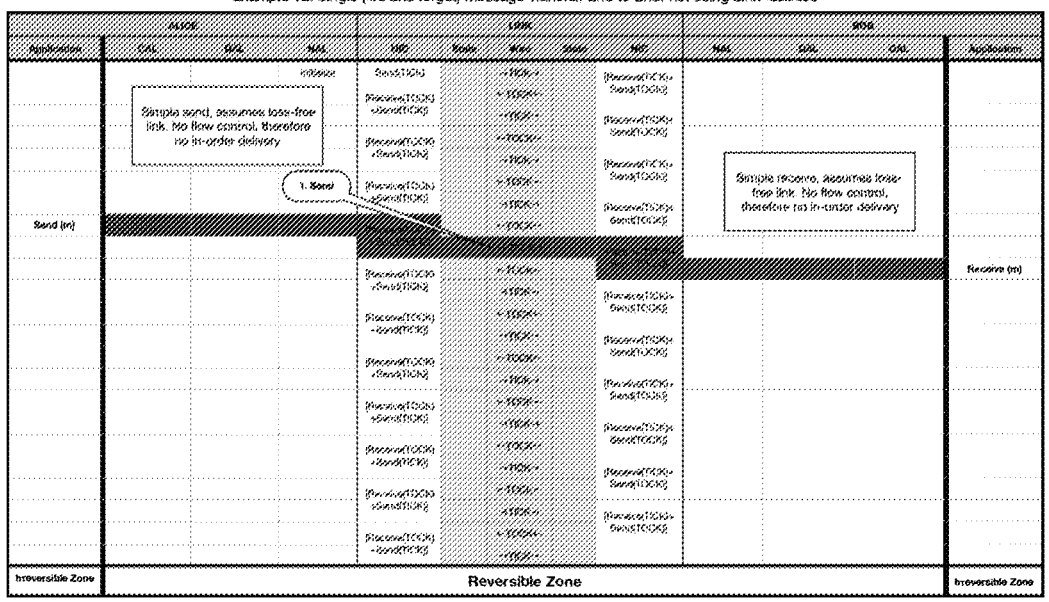
FIG. 21 Alternative description 1 a: Single (fire and forget) Message Transfer, End to End, not using Link facilities.
Figure 22:
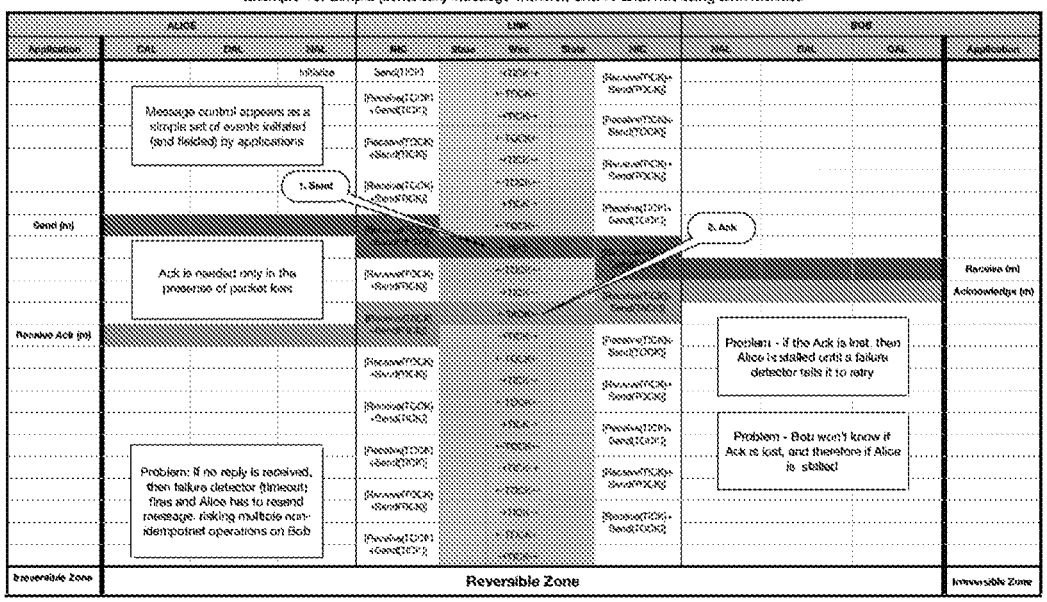
FIG. 22 Alternative description 1 b: Simple (send/ack) Message Transfer, End to End, not using Link facilities.
Figure 23:
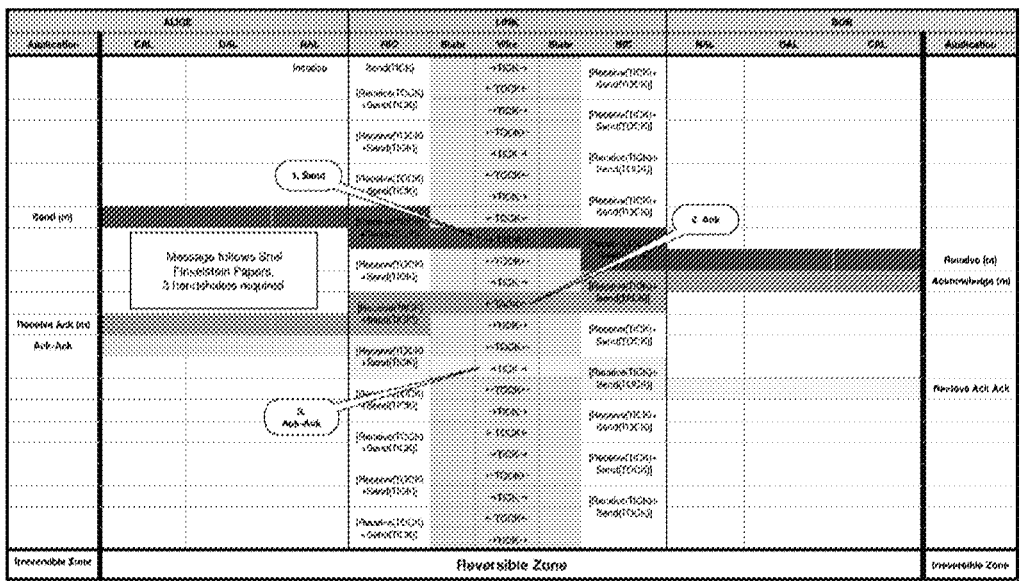
FIG. 23 Alternative description 1 c: 3-Phase Message Transfer, End to End, not using Link facilities.
Figure 24:
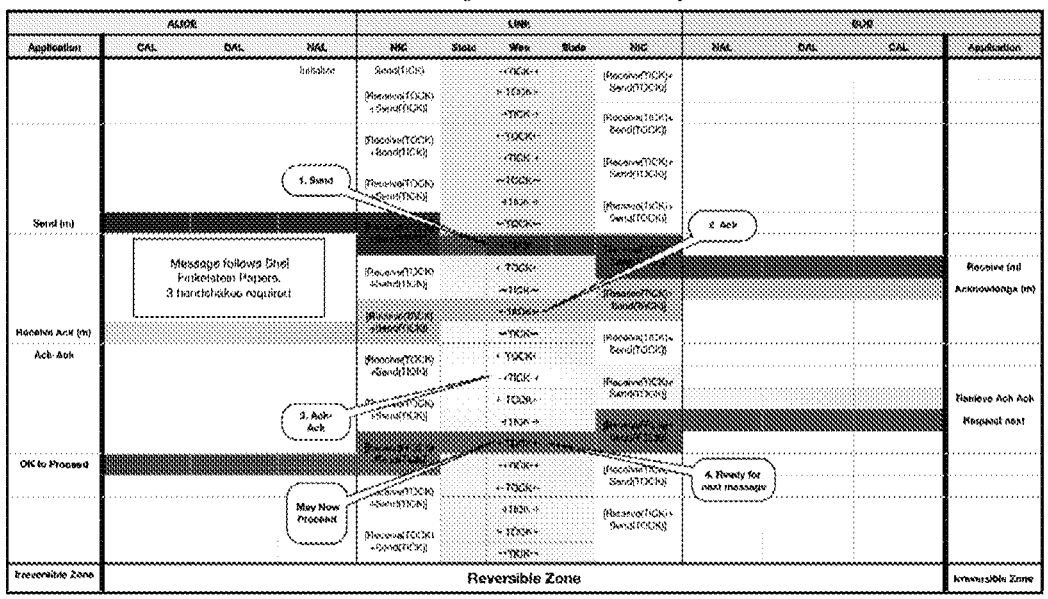
FIG. 24 Alternative description 1 d: 4-Phase Message Transfer, End to End, not using Link facilities.
Figure 25:
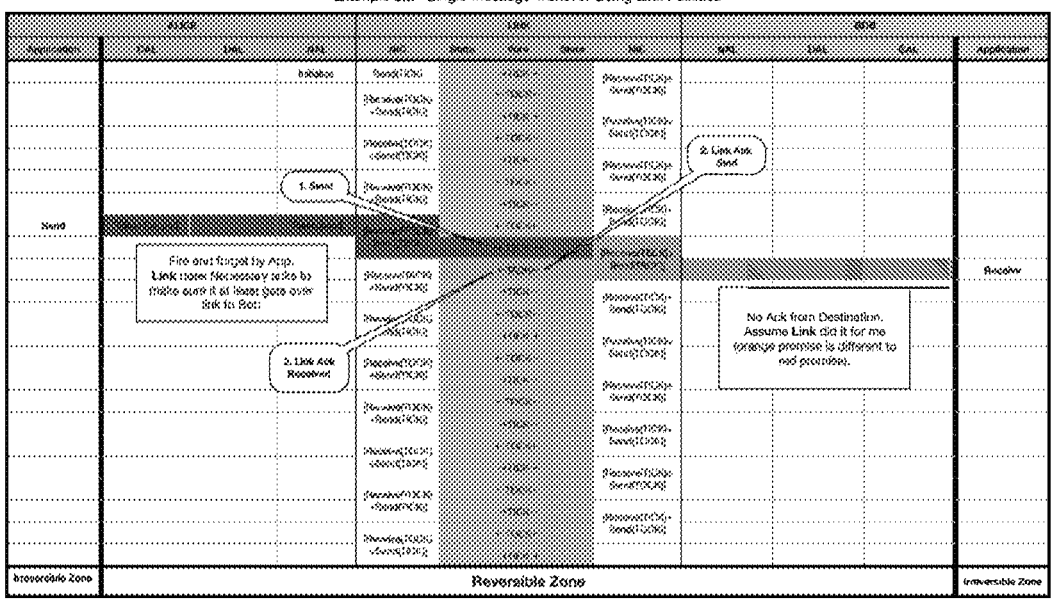
FIG. 25 Alternative description of the above protocols depicting Interlocked Transactions.
Figure 26:
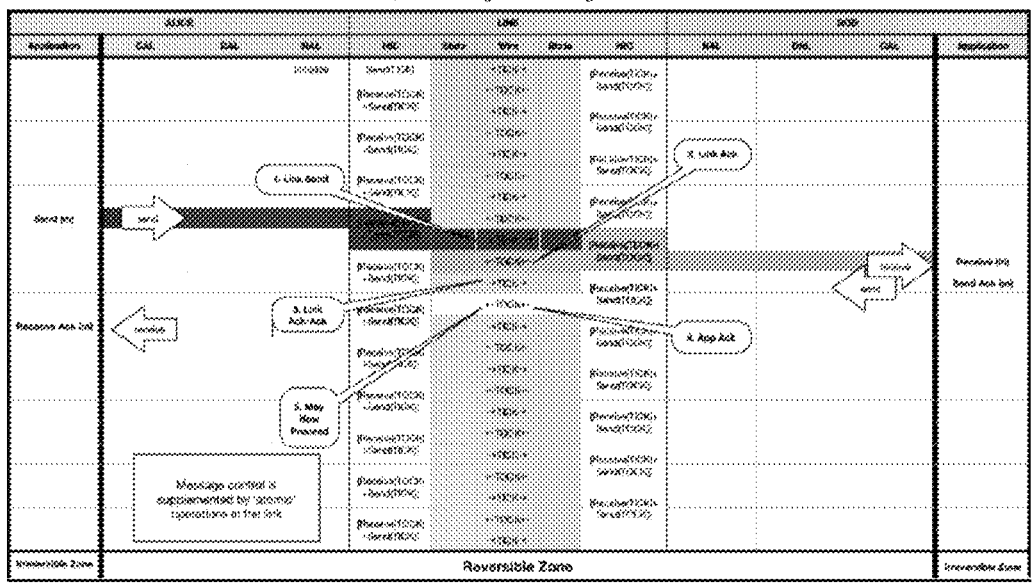
FIG. 26 Alternative description 2 b: Message Transfer using Link Facilities.
Figure 27:
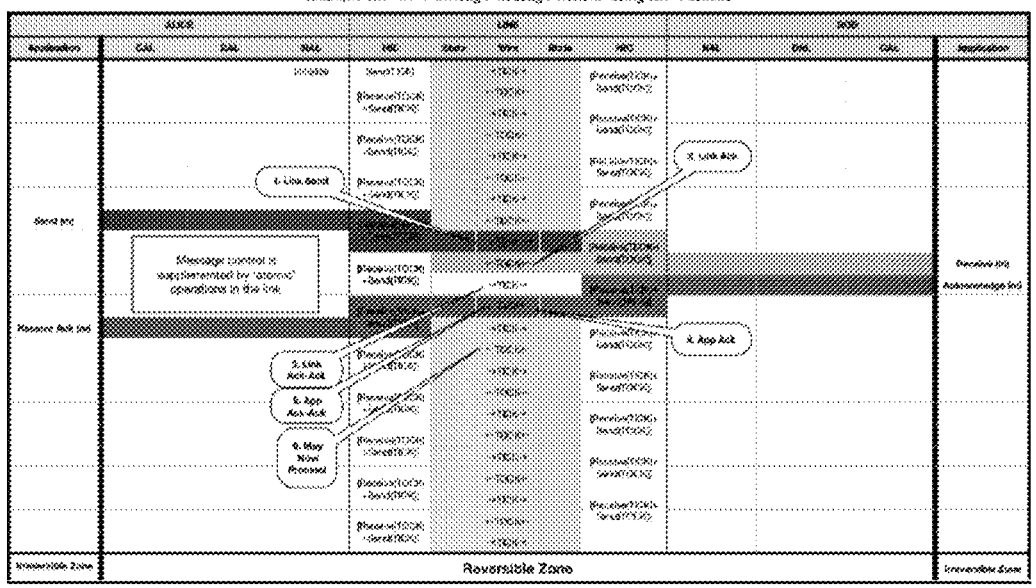
FIG. 27 Alternative description 2 c. Example showing more complete protocol, with final flow control CK exchange.
Figure 28:
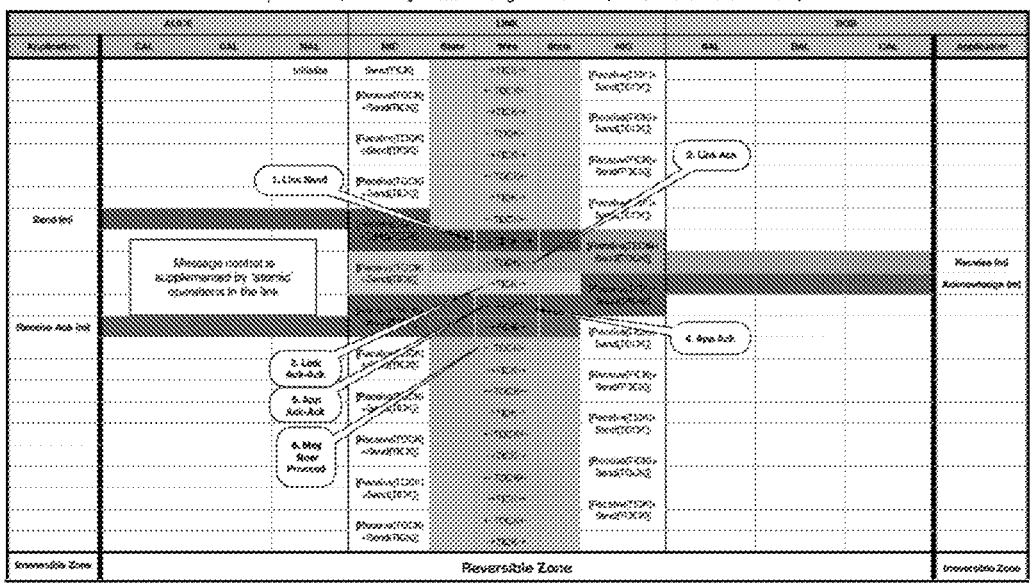
FIG. 28 Alternative description 2 d. Token Ownership, Borrowing and Transfer.
Figure 29:
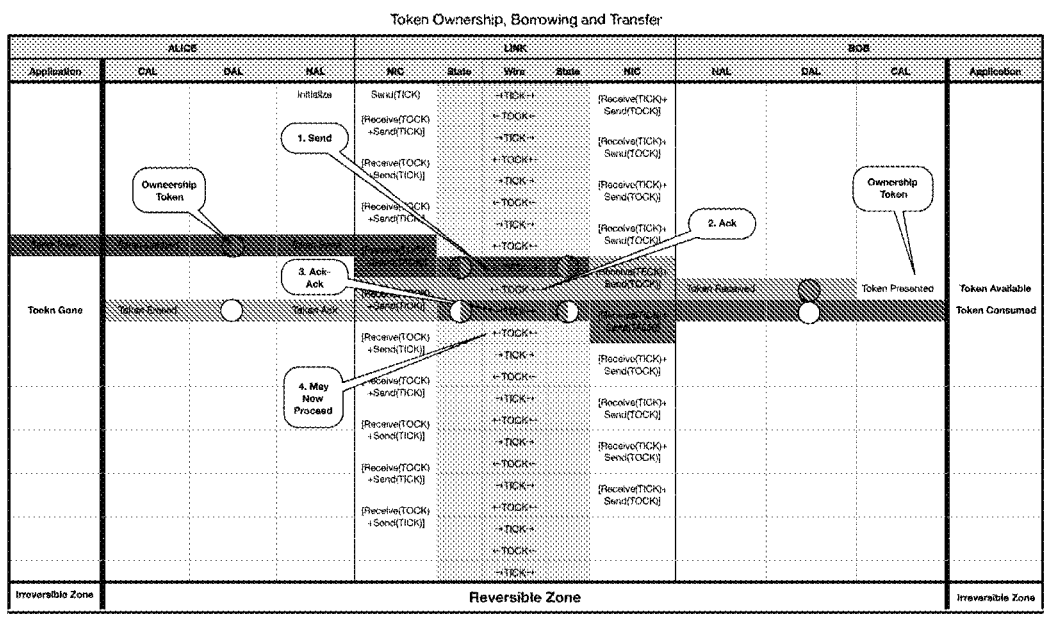
FIG. 29 Alternative description 3 a. Simple high-performance ownership token transfer.
Figure 30:
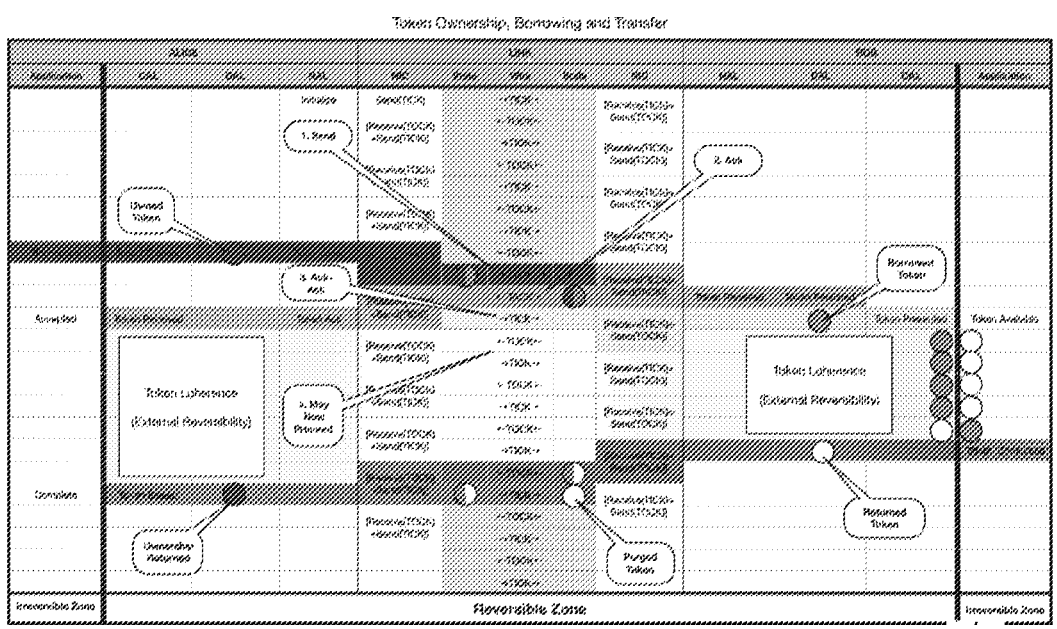
FIG. 30 Alternative description 3 b Token Ownership, Borrowing and Transfer, showing token coherence across both sides of the link.

FIG. 20 Shows an example of using a circular ENTL Token to maintain cluster liveness (and cohort readiness) for the consensus tile or for subsets of 3, 5, 7, 9 cohort sets. These circulating tokens can be used to detect failures in consensus tile liveness. For example, when using multiple sets of 3 (consensus triples), 5 coordinator+top, bottom, left and right, or any sub-tile to circulate liveness (ENTL) tokens that overlap to detect that one of them is missing.

Figure 9:
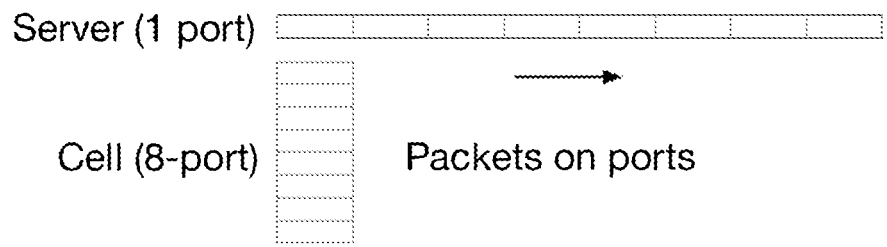
FIG. 9 Cellular Fabrix cells have a valency of 8-12 instead of the (typically) 1 port on a conventional Clos network. This means that when a consensus protocol is executed on a conventional server that has 5-7 members of the cohort, the messages all go serially down one network port. In the CF, these are all multicast, in parallel, as shown in this figure.

FIG. 9 shows Cellular Fabrix cells with each of its cells having a valency of 8-12 instead of the (typically) 1 port on a conventional Clos network. This means that when a consensus protocol is executed on a conventional server that has 3-7 members of the cohort, the messages all go serially down one network port. In the CF, these are all multicast, in parallel, as shown in this figure.

FIG. 11 shows a Consensus Tile with two failures and failover. Any cell in the tile (1-hop neighbor) is able to recover if the coordinator fails. Recovery node is either preselected by the center coordinator OR is subject to voting in several different approaches. The protocol can handle arbitrary failures as long as at least one cell remains.

Figure 12:
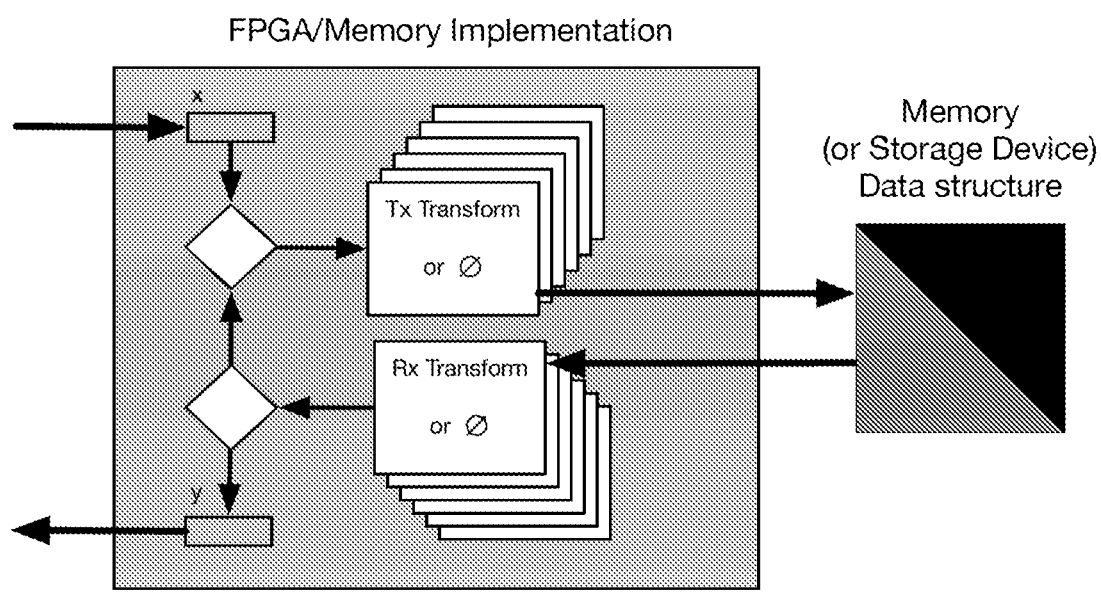
FIG. 12 shows the in-memory emulation of the Link Indivisibility protocol, implemented in a memory controller or other logic close to memory. Transforms are (logically) available to the Tx (write) and Rx (read) interfaces. In this case, Liveness (the ENTL protocol is implicit in the bus cycle of the memory subsystem.

FIG. 12 shows the in-memory emulation of the Link Indivisibility protocol, implemented in a memory controller or other logic close to memory. Transforms are (logically) available to the Tx (write) and Rx (read) interfaces. In this case, Liveness (the ENTL protocol is implicit in the bus cycle of the memory subsystem. The Transaction (ENTT) protocol is carried out through memory transactions—similar to Test and Test and Set (TTAS) instruction combinations, such that the Token Conservation Property is maintained and may be appropriately integrated into the cache coherency protocol of the system (e.g., bipartite cores are informed via an invalidate or update protocol to "wake up" to the event representing the Atomic Information Transfer (AIT)—e.g., the tick tick of the liveness transform has been changed by information in the adjacent data element on either the left or right or explicitly by introduction through an API for the Database/Application).

Figure 13:
FIG. 13 Three Elements—shows the basic protocol for 'three' elements—Alice (A), the Link (L), and Bob (B). The simplest abstract view of the system is three elements.

FIG. 13 shows the simplest abstract view of the system, an embodiment of 'three' elements—Alice (A), the Link (L), and Bob (B). This is (loosely) similar to a cellular automaton, where the center cell constructs its state from some combination of the state in the cells on either side. The system may be extended to any arbitrary number of elements, although in practice, when considering homogeneous systems, the number of elements on either side of the center element will be equal, resulting in 2N+1 levels of knowledge representation. This is the minimum configuration when two or more cells (nodes) are involved and there is at least one Link. The endpoints are singular entities. A single transmitter for the Alice Token and a single receiver for that token at Bob.

Figure 14:
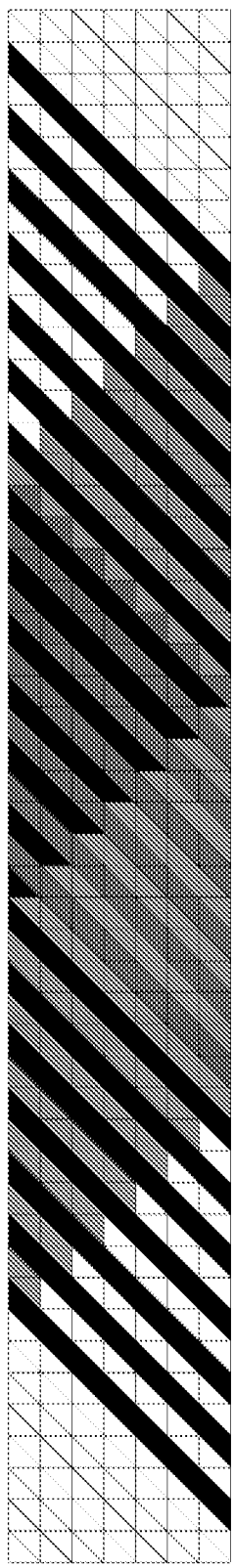
FIG. 14 shows a seven-level implementation of the invention. Going deeper into each side on Alice and Bob with seven Levels (3 on Alice and 3 on Bob, with an element called 'Link' on both sides) will reveal more structure of Common Knowledge within the operations the database wishes to perform.

FIG. 14 shows a seven-level embodiment of the invention. Going deeper into each side of Alice and Bob with seven Levels (3 on Alice and 3 on Bob, with an element called 'Link' on both sides) will reveal more structure of Common Knowledge within the operations the database wishes to perform. This figure shows a compact topology form of the protocol. Down each vertical column, we can see the 'tick/tock' of the liveness (ENTL or other simple oscillating, stable) protocol, except when new information (AIT Tokens) traverses left to right (Alice to Bob) or right to left (Bob to Alice). This topology arrangement shows an intuitive pattern for how liveness and information flow are managed together across a horizontal combination of elements on a single cell or across two cells with a Link (as shown in this figure). This pattern may be repeated for each link independently within a set of cells (on each of, say 8 Links) in a consensus tile to compose a consensus cohort around each potential coordinator.

Figure 16:
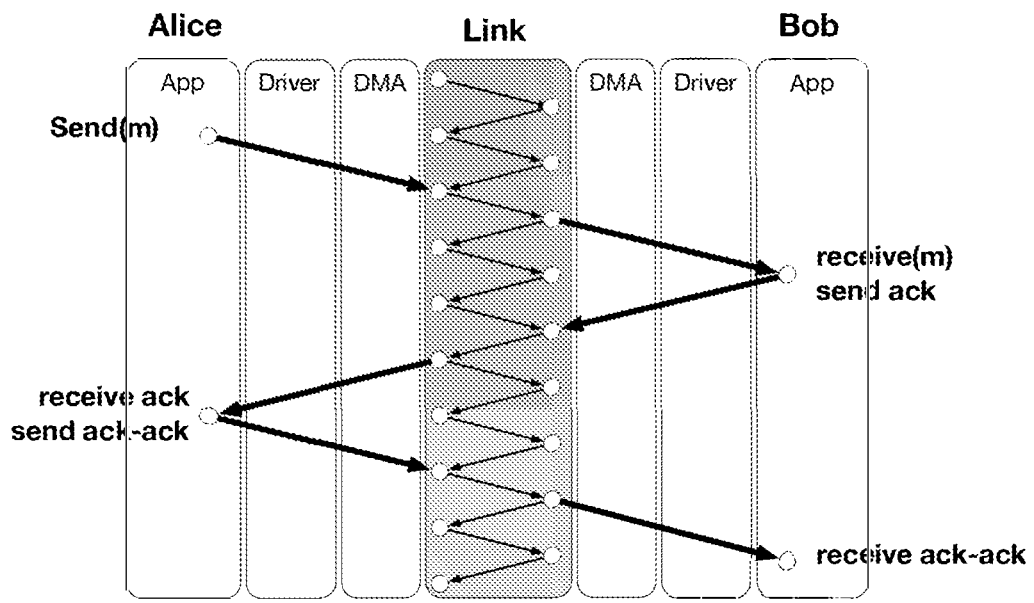
FIG. 16 shows a message Protocol without and with Common Knowledge in the Link.

FIG. 16 shows an example of an optimized 3 message protocol, equivalent to various protocols implemented in conventional practice, but now with CK (corresponding to 'completion of prior transaction managed in the Link.

Leftmost element. Message from application Alice (AppAlice) passes through the link 'transparently', and up the system layers on the other side to the application Bob (AppBob). This is 'conventional' (end-to-end) Common Knowledge.

Rightmost element: LinkBob provides local ack to LinkAlice (storing knowledge that it has done so in the Link) while concurrently passing the message itself up to AppBob. The same happens with the 'send ack' from AppBob to AppAlice. Note how the link provides additional knowledge exchanges between and after the AppAlice and AppBob messages. This Additional information is available should the application need it ('received msg knowledge' and 'received ack-ack knowledge'). However, AppBob and AppAlice do not need this knowledge—unless they need to carry out a recovery in the case of a failure.

Figure 17:
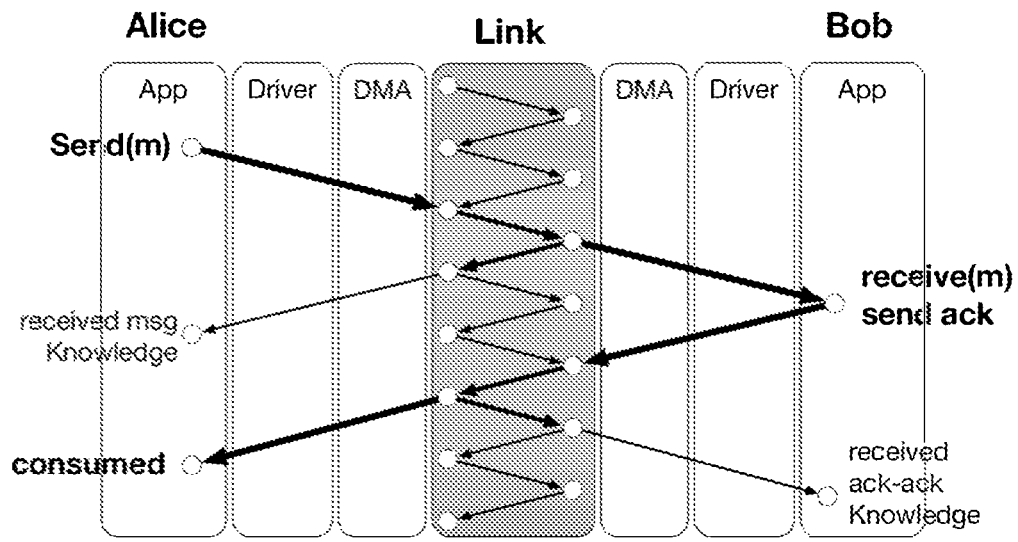
FIG. 17A description of the same protocol as in the previous figure, but with the link providing an 'early acknowledge' to the Alice Application (AppAlice), so that (for example, the database) can exploit various performance optimizations.

FIG. 17 shows a 2-message protocol which may be implemented with Common Knowledge being returned in the link. Rather than wait for the protocol to be returned by the Application in Bob, the link can return the acknowledgement (that it has been received by the NIC) much faster. Describes effectively the same protocol, but with the link providing an 'early acknowledge' to the Alice Application (AppAlice), so that (for example, the database) can exploit various performance optimizations. E.g., flow control to the application, without having to sacrifice safety knowledge because the Link can store the fast responses by the other cell, without slowing down the entire path. Common Knowledge that enables recovery is managed in the Link instead of by the applications on both sides. This example can be generalized to manage various types of knowledge, for example, in the Driver or DMA.

Figure 18:
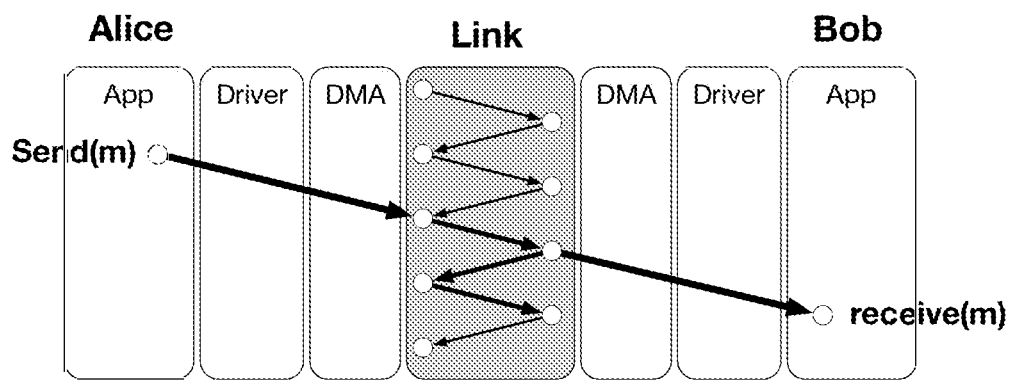

FIG. 18 shows a more extreme example, with a 1-message protocol (Zero-phase commit), where 'safety' CK is maintained with ultrafast operations within the link, and the application/database need not be involved in managing this kind of information.

Link3-1-Phase Message Protocol using common knowledge in the Link. The link can provide additional Common Knowledge (CK) exchanges after the AppAlice and AppBob messages have gone through. This invention distinguishes between CK that must be provided to the application (to satisfy constraints only it knows about), and that which may be dealt with in lower levels, such as in the driver, the persistence layer, the DMA interface (token coherence), or in the Link itself. This 'Multi-layer' approach to managing CK is a more generalized form of atomicity for distributed systems, using chains of entangled links (or memory) where entanglement may be emulated for the purpose of reversible atomicity to achieve reliable consistency.

When errors occur (such as lost packets), The Dense Graph of Inexpensive Connections (DGIC) of the Cellular Fabrix, equipped with the Link protocols, will almost always be able to recover and re-route the packets around failures faster than the application or database will be aware of such occurrences. Only in the most extreme circumstances with multiple simultaneous failures (which may indicate a disaster) will the application/database need to get involved. Even then, the link (in conjunction with the Data Asset Layer) can persist the state of the link through power failure and recovery of a cell.

FIG. 2 shows an example 4-message (2-Phase Commit) where common knowledge is conventionally managed in the Database/application.

Figure 3:
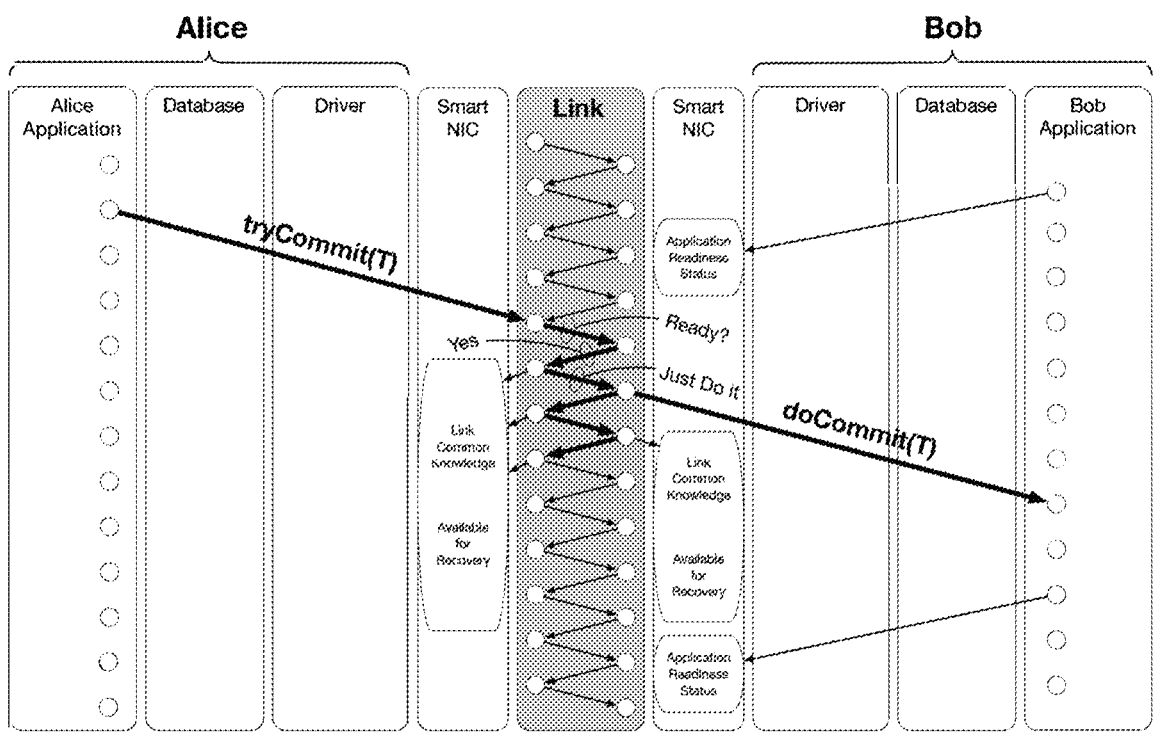
FIG. 3 Alternative ZPC (Zero Phase Commit) with Common Knowledge managed in the link. c.f. Early Return Commit (Microtransactions—Pipelined Fire-and-forget with flow control in the Link)

FIG. 3 shows an alternative ZPC (Zero Phase Commit) with Common Knowledge managed in the link. This provides Early Return Commit (Microtransactions Pipelined Fire-and-forget with flow control in the Link). It shows a more detailed version of the 1-message fire and forget transaction, with an example of the kind of information which may be exchanged in the Network Asset Layer (shown as a Smart-NIC here), which the application and database on both sides delegate to the NIC, because they are not needed for normal operation.

Microtransactions are significant to scale-out distributed systems because they reduce overheads to very low levels. By managing CK transparently in the link, the performance of applications can be improved, and CPU overheads in the application, and negative effects in the cache hierarchy, can be avoided.

Microtransactions can also be associated with trees for metering and billing. Because related applications subscribe to the same trees and the same consensus tile affinities, they will be related to each other spatially and temporally in a microservices infrastructure and thus also be able to improve their cache performance.

In the limit, fire and forget operations, which have previously been considered far too dangerous in infrastructures based on conventional switched networks, may now be used more safely because the CK needed to recover from failures may now be accumulated in the link with rapid NIC to NIC transfers, using the above AIT protocol.

In the approach described in this invention, the complementary information needed to reconstruct the Common Knowledge is persisted in the sending and receiving NICs, which means the CK carried by the token can survive the failure of the connecting cable or of the cells on either side. The application-to-application latency is almost identical to fire and forget since the link latency is far less than the main memory accesses.

The more phases we have, the more information is available for recovery. However, this information can be maintained in the link and does not need to be carried all the way up the computer (hardware and software) hierarchy so it can be seen by the application. The Database can 'make sure' by issuing the next (or a dummy) transaction requesting an explicitly acknowledged response. This flushes both sides of any pending transactions.

In FIG. 3 the database lets the link do the work of maintaining recovery CK. We call these 'Microtransactions'. Rather than relying on the application (which is now high up in the processing hierarchy—with slow main memory and cache indeterminacy problems), we instead take the CK required by the application (i.e. that the responsibility for the operation has been successfully handed off to the other system (with the persistence of the tokens in the Data Asset Layer (DAL)—as needed), and push temporal intimacy of additional CK handshakes into the link, where it can be executed much more efficiently, and without requiring CPU cycles (and cache misses) by the main processor.

Zero phase commit appears to be a 'half phase' from the application perspective. For both the initial tryCommit to the commitAcknowledge, the link is maintaining the Common Knowledge needed for recovery, so that the application doesn't need to worry about it, and the database system does not need to be slowed down by it.

Our results show that being able to recover depends on the sequential acquisition and de-acquisition of knowledge. This puts in perspective all the past 3 decades of literature in optimizing atomic commit; but in a way that enables us to more clearly reason about what CK is necessary and what is sufficient in these previous results. We can still optimize with all the ways previously discovered, but now we have a formal precision to quantify what we are giving up (in terms of recoverability) with each of these schemes. In this context, we can now take this mechanism to its logical extreme and describe the maximum performance possible on any available hardware, from the simplest 1 message (zero phase) protocol, through 2PC, 3PC, and even larger NPC protocols that wish to enrich the transaction semantics.

In principle, we are trading off CPU to CPU (C2C) latency, with information exchanges that need only N2N (NIC to NIC or Neighbor to Neighbor) latency—which can be confined to the NIC and its communications with its neighbor NIC. Links continue exchanging information indefinitely instead of only when applications wish to communicate. If this involves the detection of failures and recovery of information, it can trigger application involvement only when necessary. This allows us to make these operations, both along the paths and on different paths concurrent rather than sequential.

There are many more aspects to the design than are described here, which will now be obvious to a person of normal skill in the design and implementation of databases. In particular, there is a sub-virtualization approach which manages the reversibility zone (between Driver and database), which guarantees our 'conserved token property' (CTP).

In principle, the preparation phase may require work from the application, this is why the degenerate case is a full 2PC operation. But the Link accelerated 2PC transaction allows the resilience of 3PC without the overhead of 3 application to application roundtrips.

In practice, the application may not need the knowledge. E.g., the link status may contain information on transaction readiness that the database/application has already submitted to the link. This would allow the pipelining of some transactions without waiting for a full AppAlice to AppBob round-trip to verify that it is ready.

A potential use case includes Transaction IDs: "the overhead of synchronizing transaction ID or commit timestamp across multiple servers belonging to the same transaction domain has been a challenging problem]" (Ref: High Performance Transaction Processing in SAP HANA). This invention addresses this overhead of synchronizing transaction information by the use of tokens entangled across the link.

The 'Tree two-phase commit protocol' and the 'Dynamic two-phase commit protocol' in the literature work exceptionally well on the Cellular Fabrix (CF). because:

Clusters of 9 cells (8 one-hop connected) provide a basic hub and spoke for consensus protocols. Where the default master is the center (self) cell the 'next' master can be preselected, and connected cells can fall back to the election. Because every link is (a) an independent failure domain, and (b) operating under the liveness protocol, this will yield a far more resilient voting mechanism than is possible with conventional switched networks, which duplicate, reorder, delay and drop packets. This fits naturally with the Tree two-phase commit protocol described in the literature.

Some particular areas where we can improve the scaleout include: Databases, in, for example, FoundationDB, code is annotated with references to 'Zero or One' communication and 'One or More' communication. Enabling the use of the Atomic Information Transfer (AIT) protocol for the former and conventional packets for the latter. Combined with time reversal, this provides 'exactly-once' semantics.

The improved latency and bandwidth of the Cellular Fabrix will provide some performance benefits without the need to modify the database or application code. Simplistically, in-rack link latencies (output of a sender NIC and input to a receiver NIC) will be ~2 ns away in the CF and more like ~300 ns away through a conventional Top Of Rack (TOR) switch. Our primary advantage is exhibited in a combination of the CF, and the ENTL/ENTT protocols are used in scale-out systems. Link resilience is achieved deterministically, link by link, and not statistically by timeouts which leads to retry storms—which in turn, lead to cascade failures.

Typically, databases avoid costly short-running multinode queries by automatic partitioning. We support partitioning and sharding using trees centered on a consensus tile and entangled workload tokens: tokens that still reside in the reversibility zone on each cell but can be retrieved by the sender if the receiver queues become too long and the sender wishes to take advantage of elasticity services in the infrastructure.

We distinguish this token coherence mechanism from conventional notions of cache coherence in the shared memory model. The distinction is critical to enabling systems to be able to scale out. Tokens may be owned by only one node at a time, but they may be borrowed (loaned out) to other nodes so that the workload can be shared across multiple machines, and the owner can still keep track of it. This is an example of a workload token.

This invention achieves distributed Snapshot Isolation by using workload tokens and TID (Transaction ID) buffering on trees—which are intrinsically in-order delivery channels (from the root to any cell and from any cell to the root). Each cell along the way to the coordinator acts as a sub-serialization focus (and if needed—a cached copy).

FIG. 1 shows the consensus tile is a set of (say) 9 Cells, each directly (one ENTL/ENTT hop) connected to a self-cell (which can distinguish itself from its 8 neighbors). The Cellular Fabrix is a mesh of cells with valency 8+ that corresponds to local connections in a datacenter rack. The center (self-cell) is implicitly the coordinator for any transaction requests received from clients. The figure shows a 3×3 (minimum) tile, and a 4×4 (extended) tile—which allows for the failover of a single tile to one of four alternatives. This is a Dense Graph of Inexpensive Connections (DGIC)—Cell valencies in the range 6-12, where cells are directly connected to each other rather than a separately switched network, provide far greater resiliency. Core cells with 8+ports connected to their neighbors in a Neighbor-to-Neighbor (N2N) arrangement are effectively immune from partitions.

FIG. 4 shows 4-Phase Commit. Fully reversible protocol. Common Knowledge Managed in the Database/Applications (AppAlice and AppBob). The semantics do not matter. All that is important for the protocol to provide is a precise representation of the 'knowledge' that is accumulated and disaccumulated through the various phases of the reversible protocol. In this invention, the 'meaning' ascribed to the messages is irrelevant; the consistency of the lattice operations in the MetaData Tensor (MDT) provides a consistent framework for proving and verifying the invariants of the protocol.

FIG. 5 shows Common Knowledge event visibility, reversibility, and handshake phases in a set of transaction Layers.

FIG. 6 shows the Generalized Reversibility Framework (GRF). No outside observer can see neither or both tokens. It can't be observed until it is consistent, i.e., all the tokens (one on each link) have achieved 'consensus'; i.e., all have committed. Entanglement implies that we know everything that we can know about a system (i.e., the elements on both sides of the link), however, we know nothing about each element of the link. The consensus tile protocol, therefore, ensures that if any one participant aborts (in the ALL protocol)—the globally resolved state will fail. Or (in the majority protocol), the global commit will succeed if a majority has committed. This majority is only visible to the coordinator, but participants may see the failure by lateral communications with each other on the consensus tile. A person of normal skill in the field will be able to design one or many protocols that achieves this objective once they have been introduced to this set of concepts and descriptions of the invariants they enforce.

FIG. 7 Cohort (a). Multi-phase cohort communication. When using ENTL/ENTT links, timeouts are not required for a failure detector. The consensus tile has sufficient redundant events it can harvest from other ports. This is the first set of phases—building up the knowledge in the link in order to perform an entangled transaction. Note that it begins from only the coordinator having knowledge, and after various communication phases, both sides can maintain entanglement indefinitely with a simple tick-tock. The entanglement is broken by an event, typically by the coordinator who has maximum knowledge before other members of the cohort; or by any member of the cohort who detects an error or inconsistency to trigger successive reversal to a previously good state.

FIG. 8 Cohort (b) (continuation of FIG. 7). When using ENTL/ENTT links, timeouts are not required for a failure detector. The cluster has sufficient redundant events it can harvest from other ports. Tearing down the knowledge in the link in order to make the transaction 'irreversible'. Note that these phases end with all information erased in all cells and then finally being erased in the coordinator—corresponding to 'forgetting' the transaction once it has been made irreversible.

FIG. 20 Shows an example of using a circular ENTL Token to maintain cluster liveness (and cohort readiness) for the consensus tile or for subsets of 3, 5, 7, 9 cohort sets. These circulating tokens can be used to detect failures in consensus tile liveness. For example, when using multiple sets of 3 (consensus triples), 5 coordinator+top, bottom, left and right, or any sub-tile to circulate liveness (ENTL) tokens that overlap to detect that one of them is missing.

FIG. 9 shows Cellular Fabrix cells with each of its cells having a valency of 8-12 instead of the (typically) 1 port on a conventional Clos network. This means that when a consensus protocol is executed on a conventional server that has 3-7 members of the cohort, the messages all go serially down one network port. In the CF, these are all multicast, in parallel, as shown in this figure.

FIG. 11 shows a Consensus Tile with two failures and failover. Any cell in the tile (1-hop neighbor) is able to recover if the coordinator fails. Recovery node is either preselected by the center coordinator OR is subject to voting in several different approaches. The protocol can handle arbitrary failures as long as at least one cell remains.

FIG. 12 shows the in-memory emulation of the Link Indivisibility protocol, implemented in a memory controller or other logic close to memory. Transforms are (logically) available to the Tx (write) and Rx (read) interfaces. In this case, Liveness (the ENTL protocol is implicit in the bus cycle of the memory subsystem. The Transaction (ENTT) protocol is carried out through memory transactions—similar to Test and Test and Set (TTAS) instruction combinations, such that the Token Conservation Property is maintained and may be appropriately integrated into the cache coherency protocol of the system (e.g., bipartite cores are informed via an invalidate or update protocol to "wake up" to the event representing the Atomic Information Transfer (AIT)—e.g., the tick tick of the liveness transform has been changed by information in the adjacent data element on either the left or right or explicitly by introduction through an API for the Database/Application).

FIG. 13 shows the simplest abstract view of the system, an embodiment of 'three' elements—Alice (A), the Link (L), and Bob (B). This is (loosely) similar to a cellular automaton, where the center cell constructs its state from some combination of the state in the cells on either side. The system may be extended to any arbitrary number of elements, although in practice, when considering homogeneous systems, the number of elements on either side of the center element will be equal, resulting in 2N+1 levels of knowledge representation. This is the minimum configuration when two or more cells (nodes) are involved and there is at least one Link. The endpoints are singular entities. A single transmitter for the Alice Token and a single receiver for that token at Bob.

FIG. 14 shows a seven-level embodiment of the invention. Going deeper into each side of Alice and Bob with seven Levels (3 on Alice and 3 on Bob, with an element called 'Link' on both sides) will reveal more structure of Common Knowledge within the operations the database wishes to perform. This figure shows a compact topology form of the protocol. Down each vertical column, we can see the 'tick/tock' of the liveness (ENTL or other simple oscillating, stable) protocol, except when new information (AIT Tokens) traverses left to right (Alice to Bob) or right to left (Bob to Alice). This topology arrangement shows an intuitive pattern for how liveness and information flow are managed together across a horizontal combination of elements on a single cell or across two cells with a Link (as shown in this figure). This pattern may be repeated for each link independently within a set of cells (on each of say 8 Links) in a consensus tile to compose a consensus cohort around each potential coordinator.

FIG. 16 shows an example of an optimized 3 message protocol, equivalent to various protocols implemented in conventional practice, but now with CK (corresponding to 'completion of prior transaction managed in the Link.

Leftmost element. Message from application Alice (AppAlice) passes through the link 'transparently', and up the system layers on the other side to the application Bob (AppBob). This is 'conventional' (end-to-end) common knowledge. Rightmost element: LinkBob provides local ack to LinkAlice (storing knowledge that it has done so in the Link) while concurrently passing the message itself up to AppBob. The same happens with the 'send ack' from AppBob to AppAlice. Note how the link provides additional knowledge exchanges between and after the AppAlice and AppBob messages. This Additional information is available should the application need it ('received msg knowledge' and 'received ack-ack knowledge'). However, AppBob and AppAlice do not need this knowledge—unless they need to carry out a recovery in the case of a failure.

FIG. 17 shows a 2-message protocol which may be implemented with common knowledge being returned in the link. Rather than wait for the protocol to be returned by the Application in Bob, the link can return the acknowledgement (that it has been received by the NIC) much faster. Describes effectively the same protocol, but with the link providing an 'early acknowledge' to the Alice Application (AppAlice), so that (for example, the database) can exploit various performance optimizations. E.g., flow control to the application, without having to sacrifice safety knowledge because the Link can store the fast responses by the other cell without slowing down the entire path. Common Knowledge that enables recovery is managed in the Link instead of by the applications on both sides. This example can be generalized to manage various types of knowledge, for example, in the Driver or DMA.

FIG. 18 shows a more extreme example, with a 1-message protocol (Zero-phase commit), where 'safety' CK is maintained with ultrafast operations within the link, and the application/database need not be involved in managing this kind of information.

Link3-1-Phase Message Protocol using common knowledge in the Link. The link can provide additional Common Knowledge (CK) exchanges after the AppAlice and AppBob messages have gone through. This invention distinguishes between CK that must be provided to the application (to satisfy constraints only it knows about) and that which may be dealt with in lower levels, such as in the driver, the persistence layer, the DMA interface (token coherence), or in the Link itself. This 'Multi-layer' approach to managing CK is a more generalized form of atomicity for distributed systems, using chains of entangled links (or memory) where entanglement may be emulated for the purpose of reversible atomicity to achieve reliable consistency.

When errors occur (such as lost packets), The Dense Graph of Inexpensive Connections (DGIC) of the Cellular Fabrix, equipped with the Link protocols, will almost always be able to recover and re-route the packets around failures faster than the application or database will be aware of such occurrences. Only in the most extreme circumstances with multiple simultaneous failures (which may indicate a disaster) will the application/database need to get involved. Even then, the link (in conjunction with the Data Asset Layer) can persist the state of the link through power failure and recovery of a cell.

FIG. 2 shows an example 4-message (2-Phase Commit) where common knowledge is conventionally managed in the Database/application.

FIG. 3 shows an alternative ZPC (Zero Phase Commit?) with common knowledge managed in the link. This provides Early Return Commit (Microtransactions—Pipelined Fire-and-forget with flow control in the Link). It shows a more detailed version of the 1-message fire and forget transaction, with an example of the kind of information which may be exchanged in the Network Asset Layer (shown as a Smart-NIC here), which the application and database on both sides delegate to the NIC, because they are not needed for normal operation.

Microtransactions are significant to scale-out distributed systems because they reduce overheads to very low levels. By managing CK transparently in the link, the performance of applications can be improved, and CPU overheads in the application, and negative effects in the cache hierarchy, can be avoided.

Microtransactions can also be associated with trees for metering and billing. Because related applications subscribe to the same trees and the same consensus tile affinities, they will be related to each other spatially and temporally in a microservices infrastructure and thus also be able to improve their cache performance.

In the limit, fire and forget operations, which have previously been considered far too dangerous in infrastructures based on conventional switched networks, may now be used more safely because the CK needed to recover from failures may now be accumulated in the link with rapid NIC to NIC transfers, using the above AIT protocol.

Consensus Tiles

A set of up to 9 Cells, each connected to a self-cell (which can distinguish itself from its 8 neighbors). The center (self-cell) is implicitly the coordinator for any transaction requests received from clients.

Timeouts are not required for a failure detector. The tile has sufficient redundant events in the distributed system that loss of liveness can be discovered without the need for arbitrary local timeouts, which would otherwise create race conditions.

Consensus tiles are created by directly connecting each cell to its v neighbors, where v is the valency or number of ports available. While the directly connected Cellular Fabrix and the ENTL/ENTT protocol guarantee that packets will not be duplicated, reordered or delayed, the disconnection of the link may cause packets to be lost. We, therefore, turn all lost packet failures into disconnection failures (because they are indistinguishable), and instead of performing a retry, we route around the failed link in our dense fabric.

One problem associated with an event-driven protocol is that lost packets also imply lost events, and the need to harvest events from other sources for the protocol to proceed with recovery actions.

This problem is overcome by using some combination of circular tokens, as shown in FIG. 20 or application events (i.e., the Application wishes to send information or has an Application timeout if an acknowledgement has not been received). This conventional approach may be used in conjunction with ENTT/ENTL links but may not be necessary.

A better way to handle lost events on any link is to harvest events from other links in the cluster. This mechanism is implicitly available in the cluster topology and is employed as part of this multi-cell consensus protocol. These include some combination of circular ENTL tokens, as shown in FIG. 20 and the local harvesting of events that impinge on the NIC from multiple ports. This enables the system to avoid using ad-hoc timeouts or retries, as described in previous disclosures.

The cell in the center assumes responsibility as the 'initial' coordinator for any transaction requests it receives from clients. The other (directly, i.e., one hop) ENTL links are connected to the neighbor cells. These neighbor cells may (at the behest of the coordinator) become participants, witnesses, or non-participants in the protocol.

In a Cellular Fabrix, this structure of 9 cells is true when we move only one cell over, the next cell to the right or left (or up or down) is now the center cell (and coordinator) for its transactions. Instead of needing N×the number of cells to get N—modular redundancy—as is common in the literature (e.g., triple modular redundancy), every cell in a scale-out consensus Cellular Fabrix can perform functions and at the same time, be a member of the cohort for each of its neighbors.

The links and cells in this cluster are all independent failure domains, unlike switched networks, where the switch or router represents a single point of failure affecting many links at once.

The coordinator is able to distinguish failures on any neighbor links because it has independent connections to each of them.

The ENTL/ENTT protocol also allows the coordinator to distinguish between a failure in the link and a failure of a process in the computer, i.e., above the operating system beyond the link. Examples include VMs, containers, and processes.

A particular problem solved by this consensus tile protocol is a failure of the coordinator. Each neighbor cell is not only connected to the coordinator it is also connected to either two of its neighbors (corner cells) or four of its neighbors (top, bottom and side cells), forming subtiles of 3 or 5 cells which can independently reach consensus within their sub clusters as a sub-service to the recovery of the cluster as a whole. The normal (commit path) procedure is for the coordinator to:

Establish cohort membership. i.e., send a message, and obtain acknowledgment from each of its neighbors that it is ready and available to participate in a cluster operation.

Select from the responses which neighbors it wishes to recruit for this particular cluster operation. Note that the coordinator does not have to wait for all neighbors to respond. While the full cluster would include all 9 cells (coordinator and 8 neighbors), most often, the coordinator will be able to perform a sufficiently reliable cluster operation with only 5 or 7 cells. In some cases (such as for micro transactions) 3 cells may be sufficient.

Once cluster membership is established, or if an ongoing set of cohorts has been preallocated by some higher-level procedure, the coordinator puts the cluster into an entangled state, where all cells are prepared in a state of superposition of commit and abort. It does this by issuing an AIT (Atomic Information Transfer) on each link, along with a conventional Transaction ID (TID) as a payload. Note that because of the unique topology, the coordinator can do this in parallel on all ports at once and not in series as would be the case for conventional computers, which may have only one port out to the switched network.

The coordinator now receives acceptance of the AIT token from each of its neighbor cohorts, indicating that they have accepted the transaction or rejection of the AIT token from one or more of its neighbor cohorts. The coordinator is free at any time to decide to proceed or abort the transaction based on the responses it has received so far.

The coordinator issues (in parallel) its resolution of the decision with completion of the AIT transfer to those neighbor cohorts who accepted on their links and an undo on the links where it may have received a rejection.

Each neighbor cohort now completes the 4th phase of the ENTT protocol, which indicates completion to the coordinator, and an exit from the entangled state.

The coordinator now returns all neighbors to the ENTL (liveness) state, which indicates completion of the cluster operation and permission to drop (forget) all knowledge of the previous transaction from the link and reversibility zone.

The coordinator may now (optionally) perform a cluster membership de-allocation by turning off the ENTL (liveness) protocol on each of its neighbor links, returning the cluster to its raw (uninitialized) state.

Recovery on the Consensus Tiles

Every cell can be the coordinator for its transactions. Each self-cell (for example, from the LOV perspective, is the center cell (labelled 0) in FIG. 1 (Consensus Tile). From a graph theory perspective, cell 0 dominates its neighbors (only it has direct 1-hop connections to all of them).

From this perspective, we can ask what possibilities exist for recovery if the self-cell (self-selected coordinator in the consensus protocol) dies? The answer is clear, when the coordinator cell (0) dies, there are four complementary sets of cells that remain 1-hop connected to form a triangle cluster: Cells {1, 8, 7|1, 2, 3|3, 4, 5|5, 6, 7} These are 4 sets of 3 cells. We still have triple modular redundancy within each set, and we have 4 sets to select from for recovery purposes.

The coordinator preselects its preferred (1st, 2nd, 3rd, 4th) failover proxy. If the preferred failure proxy mechanisms fail, an election takes place among any remaining cells.

As can be seen from this example, up to 50% (4) of the cohorts can fail, but consensus can still be realized with the remaining 4+ coordinator.

In a Generalized Reversible Consensus Protocol, the basic Consensus Tile has 9 cells to play with (8 cohort members and itself in a pseudo 2D plane of connections). This allows n of m (4 of 8, or 5 of 9, including the coordinator). Instead of a duration (timer) based failure detector, the master can decide some threshold for waiting for the cohort cells by not having to wait for all of them, we avoid having to wait for all the cohort events to arrive—and avoid the use of timeouts.

This helps with liveness. Instead of the cohort members having a veto, they now have a vote. And the coordinator can pre- or post-select the number of members in the cohort it would be satisfied with for its promise (policy) on availability for that transaction that it wishes to keep.

Paxos can be used exactly as it is today, with the exception that the CF is reliable (It does not drop, delay, duplicate or reorder messages).

Reversibility Zone

The link provides the Liveness protocol and invisibly executes the AIT protocol. From the point of view of the link, the Network Asset Layer (NAL) is the keeper of stable information once it has successfully completed the transfer of AIT tokens and their payload. However, from a system-level perspective, everything between the Application on one side to the Application on the other side represents the "reversibility zone". This is because tokens passed into the reversibility zone can be moved back and forth, invisible to the Application.

For example, if a token is made available to the Application AppBob, but AppBob has not yet consumed the token, then AppAlice can retrieve (request a return) the token, and AppBob will never know the token existed. AppAlice can then reassign the token to another cell utilizing the "exactly once" property of the token.

These 'work tokens' (where exactly once delivery to a single cell for execution) is different to "transaction tokens" (where exactly once commit or abort) are executed on three or more cells in a cluster. However, it will be clear to those experienced in the art how many different types of tokens can be created to serve different purposes in a distributed system and how they can be composed to perform higher-level operations that might require reliable unicast, reliable groupcast, and reliable treecast.

The above description of the reversibility zone refers only to a single unified zone before the application layer, using the link as the place where 'internal reversibility' occurs in the ENTT protocol, and 'external reversibility' can occur in the reversibility zone prior to interfacing to Applications, which are generally considered to be "irreversible".

The first significant performance benefit can be seen by having the link maintain (and exchange as needed) common knowledge that the Application or Database might not require immediately (for the happy path of a normally successful transaction) but which it will need for recovery should some part of the transaction fail and have to be rolled back.

A generalization of this simple model can illuminate aspects that would normally need to be considered in actual implementation in conjunction with a Database for practical use cases in the industry.

We extend the reversibility zone into a chain from the initial Alice, Link, Bob model (with Application/Database on the outside of the reversibility zone) to Alice and/or Bob in two, three, or more elements:

The NAL: maintains common knowledge of AIT tokens. Everything that happens in the link may deposit knowledge (e.g., AIT token payloads) in the NAL. This could be, for example, in the Static RAM or Dynamic RAM in the Network interface controller, an implementation that affords separation of failure domains inside the computer (e.g., operating systems, hypervisors and virtual machines), and those in the Network Interface Controller (NIC), which can continue operating normally even though the restart of the main computer its operating system and Applications.

The DAL: maintains the persistence of tokens, so they are available for recovery even after a cell (the whole computer) has been powered off or experienced a power failure. This zone maintains the normal persistence (stable storage) layer of a Database but with one important distinction: the data stored on the stable storage can come directly from the protocols over the link rather than having to go through the Application/Database first. This truly makes the reversibility zone "invisible" from the perspective of the Application/Database and relieves the system from potentially significant overheads that it doesn't (yet) need to be involved with. As far as the NAL is concerned, the DAL is irreversible. As far as the DAL is concerned, the Application/Database is irreversible. This "recursive" definition of reversible/irreversible generalizes to any number of layers. For the purpose of example, we will provide one more description so that we can highlight details of the transition from the reversibility zone described in this disclosure and the conventional "irreversible" nature of legacy Applications and Databases.

The CAL: (Computation Asset Layer) is the presentation layer of legacy software. While we talk about Applications/Databases, we mean all legacy software such as hypervisors, virtual machines and operating systems. For example, the CAL may be implemented in a separate unikernel, with a library available to the Application/Database. The purpose of the CAL is to provide the presentation of potential work to the app/db. Primarily, work that has already been successfully agreed upon by two or more cells in the cluster; such as transactions to be committed/finalized (i.e., transactions which have not been vetoed by one or more cohorts that are not ready or transactions that have not received approval of a majority of prepared cohorts). The final stage is to present the token to the Application/Database. However, because tokens can be pipelined within a queue or distributed across multiple queues, there may be some number of tokens "in stasis" in the reversibility zone that can be retrieved by a coordinator (e.g., as a load-balancing function), without the knowledge of the Application or Database, who don't know that they exist yet.

There is substantial literature available on the optimizations of 2PC, 3PC and consensus protocols. Many of these optimizations try to simplify (short-circuit) the operations required in the front-end of the transaction protocol, at the cost of a more expensive recovery protocol in the back-end.

E.g., instead of carrying out a full consensus protocol in each cluster operation, there may be an election of a leader, which provides a single serialization focus for a series of transactions, and a new leader election becomes necessary only if the current leader fails.

This protocol implicitly provides the leader selection because the consensus tile topology is always relative to the self-cell in the center (each cell can distinguish (a) itself, (b) its neighbors, and (c) others, not itself or immediate neighbors).

This protocol implicitly provides a mechanism to recover from the failure of the coordinator by allowing the cohorts, who are reliably connected by ENTL links to other cohorts, to detect when a failure occurs and to initiate recovery procedures that allow the transaction to complete with a global commit or abort, even in the presence of additional failure after the initial coordinator failure has been handled.

It will be clear to those experienced in the field to see how this full 9-cell cluster protocol can be implemented in subsets of the cluster, containing 3 or 5 cells, and straightforward to extend the recovery of coordinator failure to either a neighbor preallocated by the coordinator (in the initial prepare message) and to an election amongst sub clusters in the event that the preallocated recovery cohort is unavailable.

The particular advantage of the generalized reversibility protocol is that it makes precise the amount of 'knowledge' that may remain stranded on cells because of partially completed work, but those cells are now unreachable or remain processing in isolation.

The protocol is different to existing methods in that it is based on a principle of "knowledge balance". This supplements the conservation of information in the link, as described in previous disclosures, by extending information conservation to multiple cells in cluster operations. Just like in the conservation of information, which provides "successive reversibility" in the link, the knowledge balance principle provides successive reversibility in the consensus tile. This means that any accumulation of knowledge about what one side knows about the other must be matched with a dis-accumulation of information at the back end of the transaction in order to safely complete, or abort, a transaction in the face of link or cell failures. Implications include:

There should be an equal number of accumulation steps at the beginning of the transaction and the dis-accumulation steps at the end, implying an even number of total steps altogether.

This protocol also differs to the previous art, which applies only to the irreversible construction of a total ordering of events, whereas this protocol applies to the reversible construction of a total ordering of events by hiding (making invisible from the Application) any internal events that may otherwise appear out of order due to the "successive reversibility" of the protocol while it is in an entangled state.

This successive reversibility property is achieved by using a single state machine across a link between two cells instead of the usual "replicated" state machines in the literature. The advantage being that both halves of the link must remain in lock-step if the link is disconnected or the liveness protocol is stalled.

We extend this successive reversibility property of a single link to a cluster and provide reversibility of tokens across the cluster, what we call "external reversibility" as opposed to "internal reversibility" within the links.

When we say that consensus or transactions are 'entangled' we mean that multiple replicas (2 or more) are in an indeterminate (superposition) state until something triggers them to exit that state in a consistent way. By consistent, we mean in a way where the states 'complement' each other from an information theoretic perspective. Most often, this means that some of the data structure on one side of the link is 'complementary' (transpose) to the information on the other side of the link.

Practically speaking, one could say that, in conventional 2PC, the states 'committed' and 'aborted' are in an entangled state across multiple nodes (coordinator and participants)—in a 'superposition'. From this perspective, we can also view the need to update a transaction Log and an Undo log as an example of needing to keep both 'logically forward' and 'logically reverse' state in order to enable reversibility of the transaction.

In the EC Link protocols, we build an extremely simple (and thus robust) mechanism into the link to enable reversibility in the link itself, and thus, able to present this to the applications as a basic primitive (which is not available in conventional networking). Reversibility is an important invariant for atomic commitment protocols.

The generalized reversibility framework subsumes performance optimizations such as 'Early commit ack' from the ENTL state in the Link. Reversibility provides improved resilience and knowledge in the state of the tokens, it achieves this by enforcing the following invariants in the protocol that, by construction, cannot be violated:

The Conserved Token property. A simple token must exist in Alice or Bob; not both, and not neither.

Knowledge State. There are three places where the state exists:
In Alice's memory.
In Bob's memory.
On the wire (the travel state)—or—in the memory, when the memory emulates the reversible link.

State Types. There are two state types:
Simple: The token is whole and achieves the first invariant above.
Complex: the token contains information from both sides and is in an indeterminate (inconsistent) state.

The AIT protocol is designed to manage distributed tokens with an invariant called the Conserved Token Property (CTP). The specific purpose is atomicity (token indivisibility), distribution (reliable token transfer) and guaranteed observability only when tokens are consistent (i.e., complete or are completely absent).

This invention presents a new framework within which to select and characterize optimizations that could allow acceleration of three-phase commit and two-phase commit protocols, but carefully distinguishing between the common knowledge which is required by the applications (push, pull) and the common knowledge that can be managed in the link. These optimizations can be combined with other optimizations in the literature.

Similar to the literature, we refer to transaction events as: (1) pre-transaction event work, and (2) post transaction event work which includes asynchronous writing of data pages after the transaction has committed (assuming sufficient buffer space in the DAL to allow the retention of data updates until commit time, and through power failure and recovery events.

It has been known for some time that a three phase (i.e., non-blocking) version of an optimistic protocol can provide better performance (peak throughput) than standard two-phase (blocking) protocols. In general, 'two-phase' commit protocols are susceptible to blocking (if a failure occurs), whereas 'three phase' commit protocol are non-blocking.

A Perspective on Failures

Our philosophy on failure handling is radically different to conventional networks. We make packet loss a first order failure (choosing instead to preserve events and causal relationships throughout the system). Other failure modes (such as software failures in the legacy application stack) are now far more likely than recoverable failures in the fabric.

In conventional networking, with only one or a small number of ports per server, there is no alternative but to retry on the same port. In the EC design (with 8+ ports per cell), there are many more ports which can be tried. Because each of these ports is active (maintained with ENTL), we know when we do failover that there is a viable path to the cell on the other side of the broken link, and the density of inexpensive connections provides a highly local failover, without contributing to global cascades.

In an event-driven system, we convert a packet loss to a Link failure. The only failure we have to deal with is Link failure; which is recovered by another Link. This is not true for conventional networks.

Work-tokens in particular, can be reordered in the reversibility Zone. But must remain in a fixed order once the application has been exposed to them.

This is key property of Architecture. 'Reading' and 'writing' are blind in conventional computer science. But that won't work in the Cellular Fabrix (CF). The ENTL (Liveness) and ENTT (Transaction) protocols are explicitly designed to require 'interactions', i.e., a combined 'read-modify-write' between each system element. Typically, this will be implemented with a multi-word Test and Compare and Swap (TCAS) operation when shared memory represents the entangled entity.

The idea that we can just read something is commonplace: take a copy—without others knowing that we've copied it. In ENTT all operations are atomic RMW operations. One cannot read without affecting the thing you are reading—i.e., transforming it in some way. If you read without writing, you will get nonsense. More importantly: without an incoming token, you don't have any meaningful events know when to 'just read'.

Writing: the idea that we can just write something into a register; just overwrite what's there, without someone else knowing, is similarly incorrect. In ENTT, all operations are atomic RMW operations. You cannot write without affecting the writer—i.e., transforming it in some way. When writing, however, you have the opportunity to inject an event into the chain and to present a meaningful event to the other side. This is a "push" from a causality perspective.

In-doubt transactions are resolved more easily when the tokens are still available in the NICs after a failure and can be harvested for recovery by any surviving cell. In contrast to conventional consensus protocols with a 2F+1 safety invariant, the CF can survive any number of failures as long as one cell survives with full, common knowledge. More specifically, we make 'in-doubt' transactions 'entangled'. i.e. they are prepared in a state that any of the consensus participants can 'abort'.

In the CF, all cells are substitutable, can initiate their own transactions, or be the primary proposer for elections. Instead of considering itself a participant to other cells, it can consider itself a 'default' coordinator and make transaction protocol requests for other cells to be participants, observers or non-participants—either one hop away (which we call a consensus Tile or 1-hop cluster) or more than one hop away on a tree, for which the self-cell is the root.

Many optimizations with associated tradeoffs can be found in the literature (e.g., presumed abort and presumed commit). These optimizations try to make fewer log entries and send fewer messages in the hope of improving transaction performance. However, it has proven notoriously difficult to prove the correctness of ad-hoc optimizations by evaluating their behavior under various hazards because it is difficult to know if the hazard list is complete or not. Now—through the lens of a generalized reversibility framework—these tradeoffs can be understood more precisely in a mathematical model based on information (and knowledge) symmetry.

The idea of omitting knowledge, for example, concerning transaction aborts so as to 'presume' it aborted later is well established in the literature. However, the implicit assumption of these approaches is that this knowledge is maintained (or at least viewed) by the high-level applications (e.g., AppAlice and AppBob). In one aspect of this invention, we change the assumption so that this information is maintained in the link instead.

Instead of this information being missing, the database knows it can find this richer transaction state in the link, where it has been accumulated with as many information exchanges in the background without taking up CPU and memory bandwidth resources.

Reversibility and Conventional Notions of Transactionality

Every phase of messages on both sides of the link provides for increased knowledge. But the knowledge is not 'common' unless Alice knows everything that Bob knows. But such a situation has an impossibility proof in Computer Science Literature.

We change the assumption behind this impossibility proof to one where knowledge is reversibly conserved (instead of impossible or erased). For AIT operations to be successively reversible, there should be as many steps removing information (e.g., when a message has been consumed) as there are creating information. This symmetry is fundamental in the way the link works. I.e.:

Knowledge/Information is "undone" successively. For both the abort path and for commit path. Applications may decide they don't need this extra information. But the link still has it for restart after failures.

Conventional optimizations are trying to eliminate either message, or log writes (which are typically synchronous). We recognize that there is a complete Atomic Information Transfer (AIT) protocol that requires the same number of knowledge steps going in as it does come out—whether the transaction was successful or not. We distinguish the common knowledge that must go up to the layers of the application and the common knowledge in the links, which can be considered as part of the knowledge cleanup (for example, for the source to 'forget' the transaction once the destination has consumed it.

This step is done by actions on each side of the link, 'completing' the successive growth and removal of knowledge. Just because Bob, the receiver, has consumed the message doesn't mean that Alice, the sender, knows that. This is depicted in figure FIG. 5 (Common Knowledge Event Visibility).

The general result is that the number of successive phases must be symmetric. (What Bob consumes Alice must forget). And more phases (pairs of messages) are required the more layers there are in the systems on both sides to keep the transaction (token) in the reversible state. This 'internal reversibility' is key to the operation of the link at one level (the link), but then we can maintain tokens in the reversible state if we have more layers on both sides. This is what we call 'external reversibility'. We also refer to it as Token coherence (because both sides know about each other and communicate when there are changes in state. See FIG. 5. Although this nominally looks similar to the way a cache coherence invalidation (or update) protocol works, there are some significant differences. In particular, the matrix formulation of the state machine sequences requires successive evolution in both directions. The link keeps sufficient information to maintain this reversibility, whereas a typical cache line in a shared memory computer does not.

Generalized Reversibility Framework (GRF)

Reversibility and the Conserved Token Property (CTP) enable recovery directly in the link rather than through transaction restart procedures, which rely on information written to logs to 'remember' that a transaction was in progress when a failure occurred. Generalized reversibility exploits the "principle of knowledge symmetry". What knowledge is acquired must be given up in a reverse sequential order that it was acquired. This provides 'reversible' atomicity, which can be shown to be resilient to all known (and probably some unknown) failure modes. The state diagram is 'reversible': it doesn't matter if the direction of the arrows is reversed. The protocol is the same.

Conventional network links drop, delay, reorder and duplicate packets. The Earth Computing Links (described in previous inventions) are cell to cell (server to server, bypassing switches). It is well known that it is impossible to achieve reliable communication with quiescent algorithms in an environment of lossy links without failure detectors (see On Quiescent Reliable Communications).

The basic problem is that quiescent algorithms eventually stop sending messages. It doesn't matter if this is due to process crashes or lossy links; the conventional view is that some form of 'failure detector' is necessary (i.e., timeouts). The ENTL/ENTT Links solve this problem by invisibly maintaining liveness in each link separately and compensating for lost events Comparison to Traditional Atomic Commitment Protocols Atomic commitment protocols are a forward-in-time concept that tries to keep sufficient information available (in logs) to recover from a failure. The AIT and its CTP (Conserved Token Property) is a logically-reversible concept which achieves its guarantees by keeping the minimum necessary information in the link (what we might call metadata) and stepwise reversing the Link State Machine (LSM) until all the information has been recovered, or until all the information has been successfully transferred, and the information can now be forgotten. In a consensus tile, 'all knowledge' includes any participant or observer of the protocol/algorithm.

It may be used alone (as it is to maintain flow control), or it may be used in conjunction with conventional snapshots to provide various forms of snapshot isolation.

Conventional optimizations typically allow missing information to be compensated for by presumptions. One can imagine that the presumptive state is maintained in the link without the application needing to know it or not. The link can continue communicating after the application thinks the transaction is over to update any information that might be available on, for example, 'in-doubt' transactions. All transactions are at some point 'in doubt'. We call that the 'entangled state'. In conventional language: whenever the database system receives a "(retrieve from nodes)" response.

The Entangled state represents the indecision shared across multiple replicas in a conventional distributed KV store or database. In the literature, this is known as the "global" committed or aborted state. By keeping this decision in the reversible (unobservable) zone, one of the cells can trigger the exit to a decision by all of the cells.

Integrated with Wait-Free algorithms, we provide a completely non-blocking path from one cell to another. This is not possible with conventional networking, which depends on events being provided by the application, whereas we can provide continuous successive events in the link itself. When those successive events are causally circulating without interruption, we call it 'coherence'—common knowledge contained in tokens on both sides (in any number of layers) remains aware of (complimentary copies of) itself across the link.

FIG. 13 shows a mechanism that maintains entanglement (necessary for liveness) but, more importantly, maintains successive causality to provide deterministic knowledge (on both sides of the link) for any failure. The ENTL protocol guarantees that bad things won't happen, e.g. out of order delivery, through failure and recovery events, and the Cellular Fabrix DGIC guarantees that partitions do not occur in most circumstances, even when several links are failing at once.

In order to support real implementations, the protocol is generalized to any number of 'levels' in the hierarchy in each cell. FIG. 12 provides an example of three levels. The next section provides several levels as a more realistic implementation, which includes the management of state (common knowledge information) for different aspects of reliability, such as:

Network Asset Layer (NAL) provides fabric redundancy to neighbor cells (such as the 1 hop neighbors in the consensus tile).

Data Asset Layer (DAL) provides stable storage (persistence layer redundancy) in case of power failure to this cell.

Computation Asset Layer (CAL) provides application semantics for the transaction, enabling the client to know that the truncation has been verifiably captured (or not).

We will now go through the description piece by piece: (referring to FIG. 14).

[white, white] A structure with two white triangles is not 'live': the matrix transpose may swap elements, but the swapped elements are indistinguishable.

[white, black] Introducing the black state creates a 'live' state—Two passes through the transpose results in the original state. A basic tick-tock. Introducing the black state from the outside, i.e., from the left (a process interjecting the new state). This highlights an important principle in the design: Structures are influenced by their neighbors, similar to cellular automation, but with more potential states than just on or off.

[white, black]. In each step (down the page). Each structure is 'live' and propagates (to the right) one element at a time until it reaches Bob. The state of the classical entanglement is captured in perpetuity. If the link is live, all three elements are live.

[black, grey] The rule for 'B' is when it sees a change from not live to live, it responds with grey. This can be considered as an acceptance of the entanglement protocol. This may continue in perpetuity (black/grey) liveness.

[grey, red] After an arbitrary number of black/grey exchanges, 'A' may introduce the red state to be transmitted (and offered) to A as transaction knowledge.

[grey, red] Red propagates from A through the link to B. For each step, red replaces grey (i.e., switching from liveness to transaction, with red being the transaction request).

[red, black] Red (the knowledge supplied by A) is offered to B. B pulls that knowledge off and replaces it with green (the complement of red).

[grey, red] Green propagates from B back to A to notify A that B has received and registered the knowledge.

[red, green] A receives green, transposes back to black to 'undo' the knowledge of red.

[green, black] B receives black, forget green, and transforms to grey (back to the original liveness state.

[grey, black] A receives grey/black. At this point, the link can remain in the entangled state in perpetuity—or until it wishes to send another knowledge (red) token. B can also decide to 'undo' the entanglement and return the link to the unentangled state. This process is described from the Point Of View (POV) of Alice (A). The protocol can also have the same protocol from the POV of Bob (B), perhaps to prepare the link for a transaction B wishes to initiate.

The description shows the happy path—for a 'forwards-in-time' view of transferring knowledge from the Alice irreversible zone to the Bob irreversible zone.

Conventional locks and multithreading are a catastrophe for high-performance systems. All advances in current distributed systems programming and databases are moving toward replacing them with an event-driven architecture with non-blocking or lock-free (obstruction-free) operations. This precisely matches the concurrency architecture of our Transaction Fabrix and link protocol.

Traditional locking is susceptible to priority inversion, convoying, deadlock, livelock and blocking due to thread preemption or failure. Experienced distributed systems developers have learned to avoid them. In many cases, lock-free approaches bring performance benefits, but that's a minor point compared to the need to guarantee freedom from these hazards.

It's not possible to understand the protocol by thinking of it as a conventional cache coherency lock. It's not a lock. You can't read it without destroying it. The closest analogy is "compare and swap on the wire". Once we understand that the rack-scale failure model is really about resolving uncertainty (Shannon and mutual Information), new possibilities open up in solving many vexing problems in distributed systems.

The fundamental breakthrough for distributed systems provided by the EC Link Protocols is the creation, distribution and retirement of indivisible, non-copyable tokens. We replace complex and difficult-to-reconcile notions of atomicity in shared memory with simple and precise notions of tokens which can be accounted for across distributed systems in the presence of all known failure hazards. We replace ambiguous isolation levels with stacked trees on programmable data flow graphs, which can be more easily reasoned about to manage concurrency and be formally verified.

Extended Description—Seven Entities

FIG. 6 shows the consensus tile (physical set of cells) and the entanglement cohort (logical set of cells participating in each consensus). Although the entanglement cohort in this invention applies to an even number of entity depths in the cells (nodes) on either side of a link, the technology includes one or more 'Link' entities. In particular, the Link behaves exactly like the reversible elements in the other relationships described in this system, with the exception that it is intended to be a communication element between cells instead of a shared-memory element within cells, as described in prior disclosures. Each square has two half triangles to represent the state transfer. For a normal (successful) operation all the information transfer from the source (initiating cell), i.e., coordinator, appears as diagonals to the down and the right. Complementary information (which, simplistically, may be thought of as acknowledgements of information received) appear as backpropagation from right to left. The first white area is where a path has been prepared from the source to the destination to establish entanglement. Entanglement is the process or circulating causality in the links. It may be through simple liveness (symmetric are you there) packet exchanges or carrying some higher-level information content. The second area (black/gray area) represents the entanglement acknowledgement, which may propagate the entanglement state. Initially, this may be thought of as an answer to the question, 'are you there? This 'ENTL' state is completely symmetric; it may repeat 'in-perpetuity'.

The third area is where the initiator now sends an AIT (Atomic Information Transfer) token. This (red) information propagates to the recipient, where it creates an 'event' (e.g. the arrival of the AIT token).

There are many enhancements and optimizations possible in this protocol, e.g., the last phase may be optionally changed back to either 'entangled' or 'unentangled'.

Generalized Reversibility Framework

The Generalized Reversibility Framework (GRF) is a transaction model designed for the precise management of common knowledge. It may be considered a generalization of Lamport's 'consensus on commit' and subsumes many optimizations that can be found in the literature in a precise and consistent framework of Common Knowledge (CK) stored in the link instead of having to traverse the software and hardware elements up to the application in the computer every time. This invention establishes where each of the phases represents the 'growth of knowledge' or the 'teardown of knowledge' in a fully symmetric manner; with an entangled state occupying the 'timeless' center of the transaction, which remains in a timeless state until collapsed by an operation on either side of the system.

One can easily imagine many optimizations of this scheme such as liveness tokens decorated with work items waiting to be done, cache presence, or redundancy or persistence replication completed. Many of these optimizations may be created in software or firmware; some of them may integrate with existing hardware mechanisms such as DMA and Cache Coherency.

In this invention: 'generalized reversibility' refers to software and/or hardware mechanisms that preserve Common Knowledge (CK) symmetry in a chain of two or more data elements, some of which pass through memory, and some are achieved with Links between cells; such that: any knowledge acquired in the preparation phase to an entangled transaction in this chain is given up in the reverse sequential order that it was acquired. This approach is counter to the normal practice in the industry of attempting to short-circuit operations in the hope of improving performance. An engineer with normal skills in the art of distributed systems or protocol development would be able to take this description and come up with one or more implementations to achieve this goal in practice.

The literature already established that 2PC is blocking (under failure) and 3PC is a scalability bottleneck. Here we examine the steps in a generalized framework (of which 2PC and 3PC are degenerate cases of Paxos consensus on transaction commit) and illuminate the differences in this invention with the symmetric and successive accumulation (and dis-accumulation) of knowledge at each stage of the atomic commitment process. This provides a fully reversible mechanism that can go both ways (to make an operation happen or to make it unhappen). This requires that the mechanism not erase the information or discard knowledge, which would inhibit the system from being able to fully recover after an error or failure.

This description is specific to the Cellular Fabrix (CF), with cells sporting ~8 ports. It is not entirely general (as in Gray and Lamport's Paxos Atomic Commitment, where an arbitrarily large number of nodes can participate in the protocol). Mostly due to the assumed 3N-3 message overhead of Paxos Atomic Commitment protocol, clusters (quorum sizes of 7 or more) are rarely seen in practice in modern datacenters. This may be because the classical algorithm executed on low valency cells carries with it an additional (latency) overhead that inhibits the scalability of the cluster beyond 5 nodes in practice.

The following steps describe the Common Knowledge (CK) ascent and descent as the protocol unfolds. It is intended as a commentary on the mechanism for manipulation of the data elements (a cellular-automaton type update of a data element defined by rules taking some combination of itself and its neighbors), on which the data is piggybacked in order to inherit the desirable all-or-nothing properties of the atomic commitment protocol:

A transaction begins when a node has received an event (perhaps from a client) that requires a change (update) to the distributed database (DD). Every cell can execute as a coordinator for its cluster, and every member of the cluster can decide to volunteer to be a member of the cohort (the volunteer vector V [ ], the coordinator can then select the participants from the volunteer set: we call this the participant vector P[C1, C2, C3, C4, C5, C6, C7, C8,]. This is the set of cells expected to participate in the next stage.

It is important to realize that P [ ] is needed in order to decide on how many represent a quorum (e.g. 50% of 8 is 5, prior to beginning the transaction). The quorum and the vote are two different things. The former is the number of potential participants, while the latter is the number of participating members of the cohort. The consensus tile, in its generalized form, allows the leader to dynamically select the number of committers that it is satisfied with and not be stalled waiting for slow or failing participants.

Redundancy is necessary to make transactions fault-tolerant. Some subset Rs⊆Rtotal of replicas (r) selected from the pool representing possible cohorts.

The Cellular Fabrix contains only cells and links. Each cell has 8 ports. The self-cell and each of its 1-hop neighbors represent a 9-cell "cluster"—a natural choice for Rtotal because it allows for quorums of 3, 5, 7 or 9 within this 'consensus tile'.

Transaction Commit represents a protocol with a single Coordinator or Transaction Manager (TM) and some number of Cohorts or Resource Managers (RM's).

The advantage of preselecting the coordinator (TM) is performance. Leader election doesn't have to precede each transaction if the TM is already selected and ready to go.

The disadvantage of preselecting a coordinator (TM) is reliability. If the TM fails at any point in the transaction, then the system stalls and is not fault-tolerant.

There are four quantities: the single TM (one), the set of cohorts which have volunteered to participate in the transaction, the subset of cohorts which actually do participate in the transaction, and the number of cohorts which participate and are successful.

The first (message) step A→B is for the coordinator to issue a pre-prepare request to its participant vector P [ ] and wait. However, waiting is a problem because we don't know how long to wait.

The pre-prepared sets up each of the cohorts (RM's) in such a way that they are in an intermediate state of neither committed nor aborted, i.e., as far as the RM's are concerned, they hover in a reversible state until the coordinator instructs them to go one way or another. This is what we mean by 'entanglement'.

The big problem with this state is that although each cohort/participant has knowledge of itself and the coordinator, each of the cohorts doesn't yet know about the other. i.e. they don't know how many others have volunteered to participate as a quorum but also not how many are required for a majority vote. (This may be a pre-decision by the coordinator (static) or a post-decision, should some threshold not be met, and corrective action needs to be taken.

The RM's have written to their logs and then responded that they are 'prepared'. Note that writing to the log and sending the message can be concurrent with the EC Link, which continues to update common knowledge related to the begin stable storage write, complete with success storage write, and the complete with failure storage write.

The coordinator now issues a commit message to the selected quorum and waits for a vote to reach a threshold (not all votes need to be waited for—this protects against liveness hazards (loss of events) where a cohort fails at this stage).

A big question at this stage is should the coordinator wait for acknowledgement from the cohorts. After all, the commit message could have gotten lost 'somehow'. The RM could have crashed, or the write to the log in the RM could have failed. Typically, avoiding the ack is considered to be a performance optimization because this knowledge (or not) can be retrieved at the coordinator or cohort/RM after a failure. This is not a good answer. Many complexities occur because of the indeterminacy of such incomplete (in doubt) transactions, which ultimately require human intervention to resolve.

Another question is, what if all participants in the P [ ] vector are expected to respond, but one or more of them does not? The coordinator knows this, but the participants/cohorts/RM's do not. It takes another message round to accumulate this common knowledge.

Last, but not least, once a transaction has been successfully completed, both sides need to 'forget' the transaction. This operation is described in detail in our Generalized Reversibility Framework, but even in a conventional forward-in-time description of things, we need to make sure both events (message consumed) and (message forgot ten) have occurred.

The above description is described in more detail in figure FIG. 7 and figure FIG. 8. The mechanism builds on the Conserved Quantities/Exchanged Quantities (CQ/EQ) property of the entangled link described in previous disclosures by the inventor.

Figure 15:
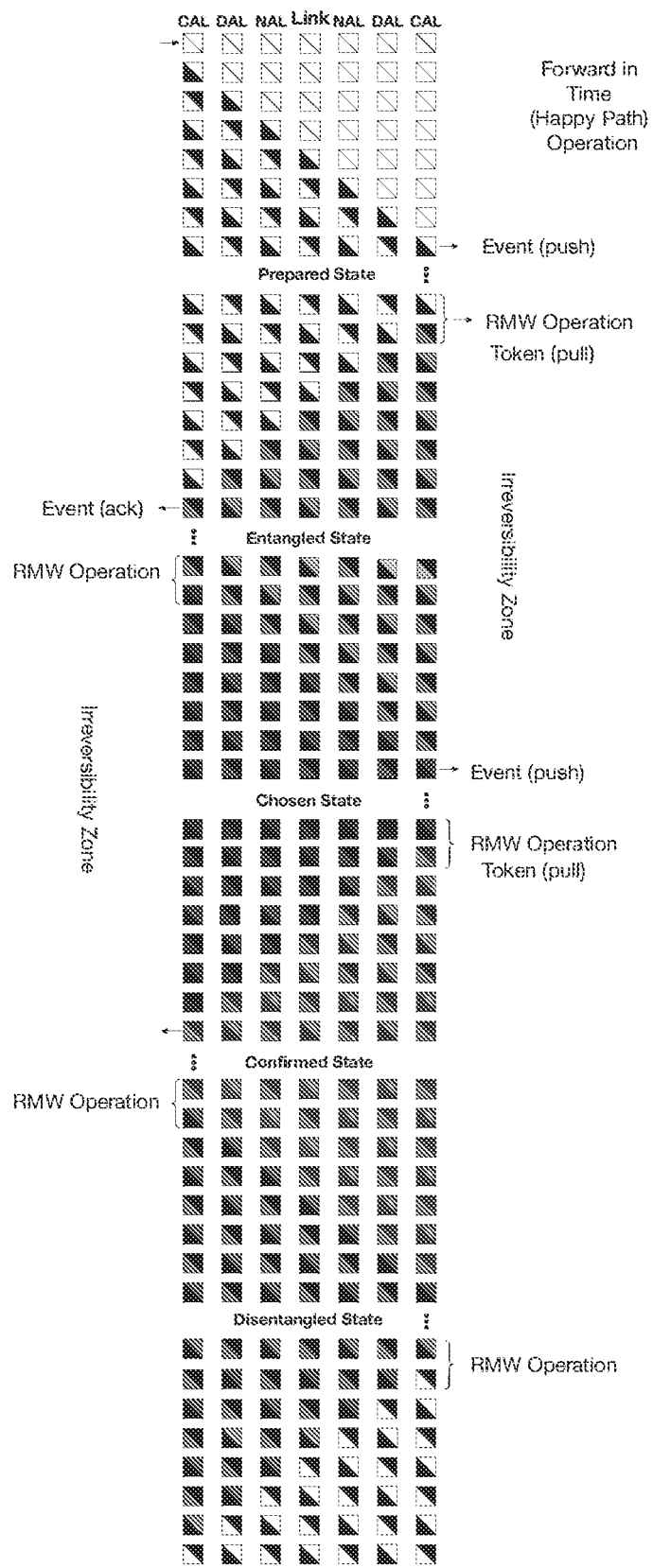
FIG. 15 shows Generalized Reversibility Framework. This is the full picture of the protocol. There are seven elements (the protocol allows any number from three upwards). In this view, instead of describing the levels as 'Alice, Link and Bob' in the previous figure or 'Driver, DMA, and App' in the following figure, we describe the layers here in a more abstract form which is more 'architecture-like': NAL, DAL and CAL.

FIG. 15 shows the Generalized Reversibility Framework. This is the big picture of the protocol. There are seven elements (the protocol allows any number from three upwards). In this view, instead of describing the levels as 'Alice, Link and Bob' in the previous figure or 'Driver, DMA, and App' in the following figure, we describe the layers here in a more abstract form which is more 'architecture-like' NAL, DAL and CAL.

In addition to the element acting as a Link, shown in the center, the lowest level, 'Network Asset Manager' (NAL), manages the protocol state. The next level up, 'Data Asset Manager' (DAL), manages the persistence of tokens on behalf of applications (enabling recovery from a power failure), and the 'Computation Asset Layer' manages the relationship with applications such as Databases; for example, providing API's for Commit and Abort for the consensus tile below, and the database view above. Each element is "indivisible" and is constructed from a combination of what it sees on its neighbors on either side. Going down the page, we see how this 'near neighbor' behavior results in the propagation of knowledge from one side to the other and the emulation of entanglement—i.e., knowledge held 'live' but in-stasis until it is consumed by the other side. Each element is modified by an atomic operation—in memory, this is a multi-word Compare-and-Swap (CAS), on the Link, this is made atomic by the Atomic Information Transfer (AIT) protocol. For all intents and purposes—in practice—the same abstraction defines both. Subsets of the protocol can be constructed from elements of the above, but with clarity on what common knowledge may be lost or overwritten in attempts to optimize—potentially resulting in consistency hazards.

FIG. 14 shows a seven-level implementation that illustrates the architectural abstraction with seven elements instead of the three in the previous description. Each square element represents a data structure (matrix oriented or otherwise) that may be 'transposed', i.e., complimented or transformed. This represents a 1-D Cellular Automata (CA), where each element creates its next state based on its previous state and the state of its neighbors. The simple liveness protocol is shown as black and grey. The protocol reaches this state by one side (say Alice), proposing an ENTL (tick-tock) 'liveness' relationship (the black/white element replaces the white/white element), and the other side (say Bob), which accepts the liveness relationship by responding with black/grey.

The liveness (black/grey) relationship may continue in perpetuity, it simply means that the system is 'live', and either side can verify that the chain is live because its own element oscillates between the tick (black/white) and tock (white/black).

Note that the transition between each state going down the page (forward in time direction) is manipulated only by atomic operations. In the NIC processor, memory is by firmware, or the main processor, by driver code. These atomic operations are single (or multi-)-word Compare and Swap Operations.

Liveness continues in perpetuity until either Bob or Alice injects an atomic token. This is shown in the figure as the transition from the black/grey (liveness) token to the red/black (Atomic Information Transfer Token). The CA now progresses from left to right and causes an event in Alice's CAL which presents the token for reading. There are no read or write operations in the protocol, only events that may trigger the application (in the irreversible zone beyond the CAL) to interact via the CAS operation.

When the black/red element reaches the CAL at Bob, it may continue in this transaction liveness state (alternating between black/red and red/black) in perpetuity. This is the simplest example of an entangled state. This element in the CAL in Alice is now 'entangled' with the corresponding element in the CAL in Bob.

The element may be a data structure or object representing a matrix, with well-defined transforms such as transposing on the elements. Or it may be a more general data structure used in modern programming languages. The simplest primitives comprising the ENTL token and ENTT (AIT) Tokens may be small and fixed in size, but they can be appended to (piggybacked) by information that the application or database wishes to communicate.

The transaction may be disentangled by either Bob or Alice. Typically, if Bob 'consumes' the token offered (by the RMW/CAS operation) swapping the red/black token with the red/green token, which then propagates element by element back toward Alice.

While the center element may represent the ENTL/ENTT Link, it could also be implemented in memory, using the bus clock to achieve simultaneity (i.e., arbitration) between the CAS instructions. In principle, the memory location is tick-tocking; in practice, active change to the memory may be unnecessary. The bus clock itself can be thought of as an alternate (but invisible) tick-tock's. The cache coherency mechanism in the computer can use Test before a TAS or CAS operation to read the operation without invalidating other caches. This is particularly valuable in implementations where cores in the main processor are pinned to the operations which carry out the transactions. The coherence elements are then coupled all the way up into the processor registers, and the RMW operation will swap the register (or register set) with the target element in memory (really, its first-level cache). There are many optimizations possible with this scheme.

When the red/green (acknowledgement) from Bob reaches Alice, the state may again stall in the entangled state. Typically, Alice will respond promptly to the ack by swapping the red/green element with a green/black element. This may be interpreted as an ack-ack, which invites Bob to return to the liveness relationship.

When Bob receives the green/black token, he will replace it with a white/black token, which flushes all knowledge of the transaction at Bob. When Alice receives the white/black token, she continues by alternating the white/black and black/white tokens to maintain liveness and indicate readiness for future transaction tokens.

The above description represents a complete cycle of Common Knowledge (CK). However, this represents a heavyweight protocol with all operations propagating from the irreversible zone on Alice's side to the irreversible zone on Bob's side.

With the above as a framework, we can now systematically evaluate whether (a) some of this CK can be executed in the lowest layer (e.g. NAL) or the link itself rather than be propagated all the way up to the application; and (b) if some of these operations can be omitted entirely; and (c) if there are opportunities for pipelining the protocol to maximize transaction throughput.

Those familiar with databases and atomic commit protocols will be aware of the many kinds of optimizations in the literature. Typically, these operations sacrifice the number of steps in order to increase transaction throughput. With the GRF described in one aspect of this invention, however, we can more clearly identify what aspect of CK may be missing and, therefore, what aspects of transaction integrity may be at risk when failures occur.

One embodiment of the invention, therefore, provides the database vendor with a spectrum of transaction types ranging from complete (with guarantees of recovery from all known failure modes) to minimal, where the highest throughput can be achieved while minimizing the number of handshakes that are required by the application or database.

The above mechanism provides several key properties important to databases and distributed systems in general:

Token atomicity—a token is 'completely' on one of the link sides or the other. But not both, and not neither. Tokens in an intermediate state are not visible to the application on either side.

Token coherence—tokens may exist in an indefinite state of entanglement on both sides of the link. The entanglement may be collapsed by the farside consuming the token or the nearside recalling the token.

Conserved token property—tokens are 'conserved' in the links and consensus tile.

These properties, in turn, may be used to provide infrastructure functionality, which may be offered to the database or application through an API or other explicit/implicit mechanisms.

For example, A conserved quantities system that enables selected members of a set to be informed unambiguously of any change in membership of a set, including an immutable log of joining and departing members. This, in turn, enables the consensus tile to specify a minimum number of participants in a transaction (i.e., a majority).

FIG. 19 shows the basic 3×3 Consensus Tile. Self-Cell is leader (L) Neighbors are followers (F) Followers may be cohort members or witnesses (W). The Leader has 2, 4, 6 or 8 cohort members (forming 3, 5, 7, 9) consensus tiles. (b) Similar situation 4×4 cells now with a self-chosen leader and three followers. Shows Followers who can perform a recovery in order of priority (preselected by Leader). (c) 5×5 Consensus Tile with all 1-hop neighbors as followers and 2-hop cells as witnesses.

In Flexible Consensus. 1-hop neighbors may be cohort members, witnesses, or non-participants.

FIG. 21, FIG. 22, FIG. 23, FIG. 24, FIG. 25, FIG. 26, FIG. 27, FIG. 28, FIG. 29, and FIG. 30 are all examples of an alternative description of the above protocols depicting Interlocked Transactions. The key aspect of these alternative descriptions, compared to the previous descriptions, is the 'interlocked' nature of the protocols. For example, each message received by the NIC off the wire is 'sent to the application and acknowledged back to the sender' atomically.

In the intermediate (yellow) area, tokens remain 'entangled,' i.e., CK of token presence is maintained on both sides, using a variant of the liveness (Tick Tock) protocol which is part of the ENTT protocol.

These protocols are designed to manage causality relationships expected by applications by treating a failure (i.e., loss of packets on a link) as a hyper-entangled state. I.e., when entanglement fails on a link, both sides of the link are implicitly promoted to the hyper-entangled state until the Cellular Fabrix has healed around the link and stitched up the data structures and can continue normal entanglement again.

Another aspect depicted by these figures is the clear distinction between the 'Reversible' Zone, where this protocol maintains the tokens, and the "Irreversible Zone', representing legacy applications and databases that may not obey the rules of the CA propagation mechanism.

The Cellular Fabrix has many advantages over Conventional Networks, including:

More ports (8 vs 1 or 2 in a conventional server), acting independently, fan-out parallel operations more efficiently. 8 one-hop neighbors plus the self-cell gives us 3, 5, 7 or 9 cell clusters ('consensus tiles').

Beyond the one-hop neighbors, the tree-based delegation protocol enables any size fanout to server proxies. This addresses the high degree of communication overhead among proxies and their touch points in some databases.

The Link itself is a computation object. The lowest level atomic token (AIT) in the Link may be equipped with additional encodings for operations (similar to the instruction set of a processor) and decorated with additional parameters (similar to the operands in the instructions set of a processor) to perform, for example, more sophisticated management of CK to rollback a transaction on behalf of an application or database. These more sophisticated operations may be such that can be programmed into FPGAs in the NIC or in FPGAs in the DIMMs The Link represents the highest achievable 'temporal intimacy' between two cells. This temporal intimacy can be improved further only by pushing the mechanisms performed in the link down into the firmware of the NIC or DIMM FPGAs or even to elements in the final stages of the hardware before the bits are put on the wire or in memory. Besides providing opportunities to simplify by eliminating unnecessary mechanisms involved in ENTL/ENTT path, it also affords opportunities to improve performance further. By simplifying this mechanism down to the smallest necessary and sufficient elements, we also enable proofs of the correctness of the implementation, we are also able to equip the link for real-time verification of (for example) the atomic properties we desire for serializable operations. This allows us to eliminate failure cases in, for example, atomic commitment protocols, which have plagued the industry for decades.

Figure 10:
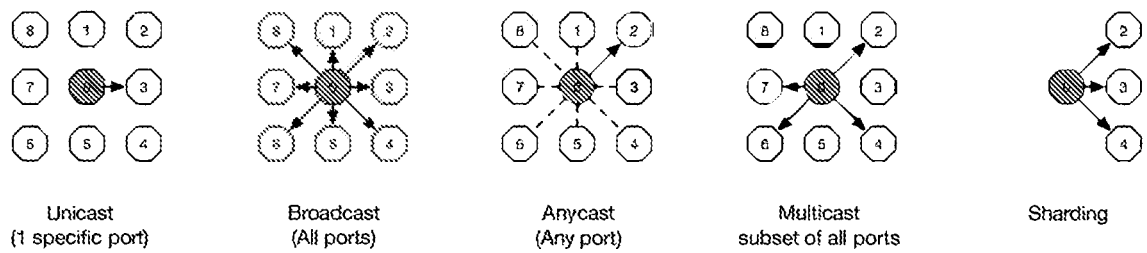
FIG. 10 Consensus Tile Operations to support database operations. (a) Unicsat, (b) Broadcast, (c) Anycast, (d) Multicast, (e) sharding.

Any time there are round trips in the protocol of a distributed application (not just databases or Key-Value stores), there is an opportunity for the application to 'delegate' operations to FPGAs in the link or DIMMs. Consensus tiles provide the ability to program serializable schedules (to achieve serializability) and to do reliable multicast, which we define as tree operations (treecast, rootcast, leafcast). This means that traditional database operations such as those shown in FIG. 10 (unicast, Broadcast, Anycast, Multicast or Sharding) can be 'encoded' as an instruction at the tree level to compose a set of lower-level 'link' instructions to perform some 'all or nothing operation within the consensus tile. Multicast (and its degenerate cases: broadcast, unicast and anycast) is a primitive operation in the consensus tile. The center cell (coordinator) can not only guarantee the all-or-nothing atomicity of these operations, but it can also provide the benefit of reliable in-order delivery, which enables the simplification and higher throughput of databases, distributed applications, and structured serializable schedules that can be guaranteed atomic.

Example embodiments include:

A computer-implemented system with a processor to manage Common Knowledge using successively reversible tokens on links between computers until the transaction is either fully completed or fully aborted.

A computer-implemented consensus system with a processor in which common knowledge (mutual information) is successively (through a finite number of reversible layers) able to deliver unique, non-copyable a token to the irreversible endpoints expressed as the irreversible zone.

A computer-implemented 'consensus tile' of a directly connected set of members of a consensus cluster (cohort), where the near-neighbors are 1 hop away.

A computer-implemented consensus system with a processor to employ a knowledge balance principle, utilizing a token conservation property, as provided by an atomic information transfer (AIT) protocol.

A computer-implemented Consensus Tile system in a set of directly connected cells (servers) in one or more adjacent racks, wherein each cell may use its directly connected neighbors to perform high reliability and high-performance consensus operations, including atomic commit.

A computer-implemented Consensus Tile system based on a Cellular Fabrix foundation, using the liveness and transaction properties of the Entangled Link protocols ENTL and ENTT to compose higher-level entangled consensus operations, such that atomic commitment protocols can prepare their commit and abort decision in the cohort as a superposition among all the distributed entities.

A computer-implemented conserved quantities system that enables selected members of a set to be informed unambiguously of any change in membership of a set, including an immutable log of joining and departing members.

What is claimed is:
1. A computer-implemented system using an atomic token, comprising:
   an entangled link, the entangled link is a bipartite link comprising two complementary halves, wherein each complementary halves maintain temporal intimacy through an exchange of a packet of shared information; and a consensus tile, the consensus tile is a set of a plurality of cells, wherein each cell in the plurality of cells is connected to:
(a) at least two neighboring cells forming a sub-cluster; and
(b) to a self-cell forming a Cellular Fabrix, the self-cell acts as a coordinator for any transaction of the atomic token, comprising:
(i) sending a message to each of the neighboring cells within the consensus tile;
(ii) receiving acknowledgement of the message from each of the neighboring cells within the consensus tile;
(iii) selecting a neighboring cell for performing a transaction from each of the neighboring cells sending acknowledgment;
(iv) putting the consensus tile into an entangled state, the entangled state comprises putting the neighboring cells in a state of superposition of commit or abort, wherein the coordinator issues an AIT on each entangled link;
(v) receiving an acceptance of the AIT from the neighboring cell, the acceptance indicates whether the neighboring cell accepted the transaction;
(vi) receiving a rejection of the AIT from the neighboring cell, the rejection indicates the neighboring cell rejects the transaction;
(vii) completing the AIT transfer to the neighboring cell accepting the AIT;
(viii) reversing the AIT to the neighboring cell rejecting the AIT; and
(ix) returning the neighboring cell to the ENTL protocol, indicating the completion of the transaction, wherein the computer-implemented system provides a reversible transfer of the atomic token from one side of the entangled link to the other side of the entangled link, such that if the exchange of a packet of shared information on either side of the entangled link fails, the atomic token is found on both sides of the entangled link to be verifiably incomplete.

2. The computer-implemented system of claim 1, wherein the atomic token is found on each side of the entangled link as incomplete unless the transfer of information is complete after passing through a reversible zone.

3. The computer-implemented system of claim 1, wherein the exchange of the packet of shared information is through an entangled link protocol comprising an Earth Non-Time Liveness (ENTL) protocol, wherein the ENTL protocol maintains liveness using a circulating token in the entangled link; and an Earth Non-Time Transaction (ENTT) protocol, wherein the ENTT protocol harvests the circulating token to provide Atomic Information Transfer (AIT), allowing the atomic token to be transferred from one side of the entangled link to the other side of the entangled link.

4. The computer-implemented system of claim 1, wherein the atomic token may exist in an indefinite state of entanglement on both sides of the entangled link.

5. The computer-implemented system of claim 1, wherein the atomic token is conserved within the entangled link and the consensus tile.

6. The computer-implemented system of claim 1, wherein the system differentiates common knowledge exchanged between an irreversible zone and common knowledge exchanged between a reversible zone.

7. The computer-implemented system of claim 6, wherein the reversible zone may comprise a Computation Asset layer, a Data Asset layer or a Network Asset Layer.

8. The computer-implemented system of claim 7, wherein the Network Asset Layer maintains common knowledge of atomic tokens.

9. The computer-implemented system of claim 1, wherein each cell in the plurality of cells comprises a valency of at least 8.

10. The computer-implemented system of claim 1, wherein the cells in the sub-cluster can independently reach a consensus within the sub-cluster as a sub-service to the recovery of the consensus tile as a whole.

11. The computer-implemented system of claim 1, wherein the completion of the transaction further permits the consensus tile to drop knowledge of the completed transaction from the entangled link and the reversibility zone.

12. The computer-implemented system of claim 1, wherein the coordinator may optionally select a neighboring cell for performing a transaction by turning off the ENTL protocol on each of the coordinator's neighboring links and returning the consensus tile into an uninitiated state.

13. The computer-implemented system of claim 1, wherein the system further comprises a single state machine, the single state machine spans two sides of the entangled link.

14. The computer-implemented system of claim 13, wherein the single state machine spans a plurality of entangled links.

15. The computer-implement system of claim 1, wherein the Cellular Fabrix includes a built-in consensus.

16. The computer-implemented system of claim 1, wherein the system is a reversible EasyCommit.

17. The computer-implemented system of claim 16, wherein EasyCommit is hosted as a logical overlay on the Cellular Fabrix, allowing for a direct connection among the plurality of cells.

18. The computer-implemented system of claim 17, wherein the system comprises a plurality of intermediate software elements between a coordinator and a plurality of cohort members.

19. The computer-implemented system of claim 1, wherein the Cellular Fabrix is a mesh of cells with a valency of at least 8 corresponding to a local connection in a datacenter rack.

20. The computer-implemented system of claim 1, wherein the exchange of the packet of information on either side of the entangled link is complete as the atomic token is delivered to an irreversible zone.

* * * * *